United States Patent
Onda

(10) Patent No.: US 9,134,755 B2
(45) Date of Patent: Sep. 15, 2015

(54) TILT MECHANISM FOR INFORMATION DEVICE

(71) Applicant: FUJITSU LIMITED, Kawasaki-shi, Kanagawa (JP)

(72) Inventor: Nobuhiko Onda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 14/156,882

(22) Filed: Jan. 16, 2014

(65) Prior Publication Data

US 2014/0218854 A1   Aug. 7, 2014

(30) Foreign Application Priority Data

Feb. 1, 2013   (JP) ................................. 2013-018514

(51) Int. Cl.
 G06F 1/16   (2006.01)
(52) U.S. Cl.
 CPC ............ *G06F 1/1601* (2013.01); *G06F 1/1616* (2013.01); *G06F 1/1624* (2013.01); *G06F 1/1681* (2013.01); *G06F 1/1679* (2013.01)
(58) Field of Classification Search
 CPC combination set(s) only.
 See application file for complete search history.

(56) References Cited

U.S. PATENT DOCUMENTS

| | | | | |
|---|---|---|---|---|
| 5,168,426 | A * | 12/1992 | Hoving et al. | 361/679.09 |
| 5,267,123 | A * | 11/1993 | Boothroyd et al. | 361/679.09 |
| 5,333,116 | A * | 7/1994 | Hawkins et al. | 361/679.06 |
| 5,345,362 | A * | 9/1994 | Winkler | 361/679.06 |
| 5,644,469 | A * | 7/1997 | Shioya et al. | 361/679.06 |
| 6,354,406 | B1 | 3/2002 | Ring et al. | |
| 7,184,263 | B1 * | 2/2007 | Maskatia | 361/679.27 |
| 7,280,348 | B2 * | 10/2007 | Ghosh | 361/679.27 |
| 8,654,520 | B2 * | 2/2014 | Lin et al. | 361/679.27 |
| 8,896,558 | B2 * | 11/2014 | Lee et al. | 345/173 |
| 8,902,585 | B2 * | 12/2014 | Tseng et al. | 361/679.55 |
| 8,908,364 | B2 * | 12/2014 | Tseng et al. | 361/679.26 |
| 8,917,500 | B2 * | 12/2014 | Lee et al. | 361/679.27 |
| 8,922,984 | B2 * | 12/2014 | Chen et al. | 361/679.26 |
| 8,947,871 | B2 * | 2/2015 | Lin | 361/679.27 |
| 9,013,866 | B2 * | 4/2015 | Yu et al. | 361/679.26 |
| 2004/0244146 | A1 | 12/2004 | Park | |
| 2006/0077622 | A1 * | 4/2006 | Keely et al. | 361/681 |
| 2008/0246692 | A1 | 10/2008 | Jeong et al. | |

(Continued)

FOREIGN PATENT DOCUMENTS

| CN | 202512479 | 10/2012 |
|---|---|---|
| DE | 101 33 470 A1 | 2/2003 |

(Continued)

OTHER PUBLICATIONS

Extended European Search Report issued Jun. 17, 2015 in corresponding European Patent Application No. 14152405.8.

*Primary Examiner* — Lisa Lea Edmonds
(74) *Attorney, Agent, or Firm* — Staas & Halsey LLP

(57) ABSTRACT

A tilt mechanism for an information device including a body and a display is capable of changing a tilt angle of the display after the display is tilted on the body by pulling up an upper end of the display laid on the body and sliding a lower end of the display over the body. One of two links is rotatably connected to the display, the other of the links to the body, the two links engage each other. Until a roller provided at the lower end of the display engages a support provided on the body, the two links firmly engage each other so as to maintain the total length of the two links, and after the roller engages the support, the two kinks are capable to change the tilt angle by changing the total length of the two links.

15 Claims, 23 Drawing Sheets

(56) References Cited

U.S. PATENT DOCUMENTS

| | | |
|---|---|---|
| 2009/0040701 A1 | 2/2009 | Lin |
| 2014/0043747 A1* | 2/2014 | Lai et al. .................. 361/679.26 |
| 2014/0043749 A1* | 2/2014 | Lai et al. .................. 361/679.27 |
| 2014/0063720 A1* | 3/2014 | Chang et al. ............. 361/679.27 |

FOREIGN PATENT DOCUMENTS

| | | |
|---|---|---|
| EP | 1 793 568 A1 | 6/2007 |
| JP | 2001-125668 | 5/2001 |
| JP | 2002-55736 | 2/2002 |
| WO | 2009/123619 A1 | 10/2009 |

* cited by examiner

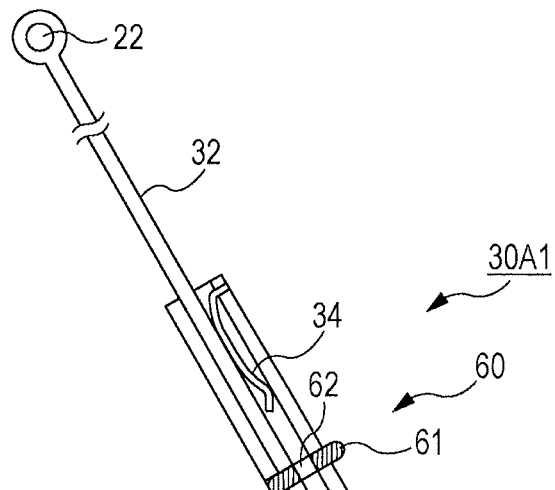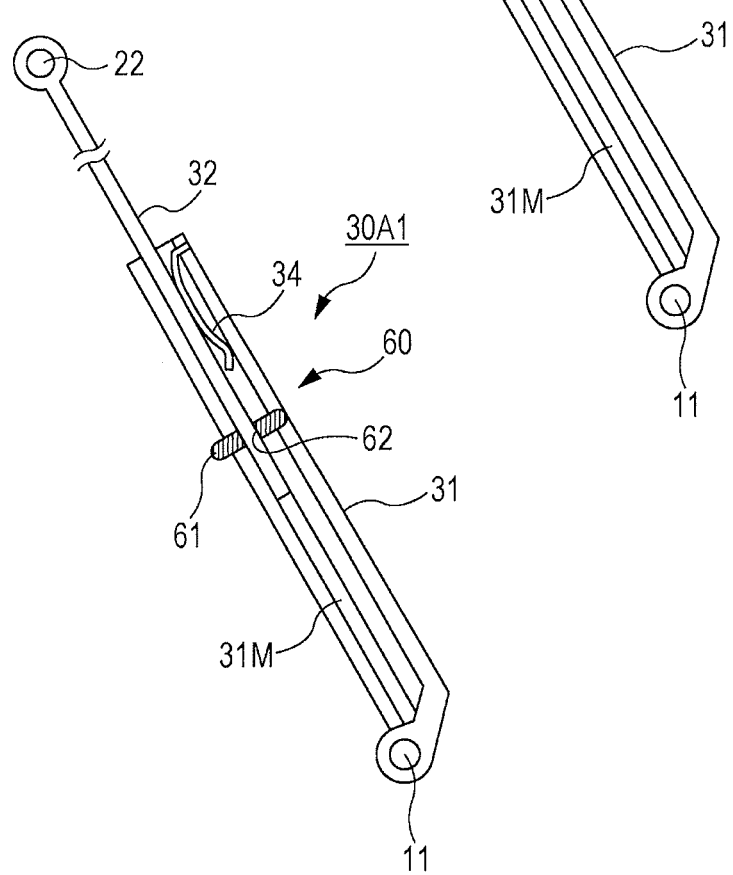

TILT MECHANISM FOR INFORMATION DEVICE

CROSS-REFERENCE TO RELATED APPLICATION

This application is based upon and claims the benefit of priority of the prior Japanese Patent Application No. 2013-018514, filed on Feb. 1, 2013, the entire contents of which are incorporated herein by reference.

FIELD

The embodiments discussed herein are related to a tilt mechanism for an information device including a body unit and a display unit, the tilt mechanism capable of changing the tilt angle of the display unit after the display unit is tilted on the body unit by pulling up an upper end of the display unit laid on the body unit and sliding a lower end of the display unit over the body unit.

BACKGROUND

In recent years, information devices have been widespread, such as tablet personal computers (PCs), notebook PCs, portable phones, and smartphones. In information devices in the past, it is often the case that with a body unit and a display unit superposed each other for closing, a display surface of the display unit is hidden inside and, when the display unit hinged on the body unit is opened, the display surface appears. On the other hand, in some information devices in recent years, with the widespread of touch panels, the display surface of the display unit appears on a front side with the body unit and the display unit superposed each other for closing, allowing inputs from the touch panel even without opening the display unit to expose a keyboard.

Japanese Laid-open Patent Publication No. 2001-125668 discusses a notebook-type personal computer (PC), in which a hinge is slidably mounted on a groove provided on each of both side surfaces of the body unit, and a lower end of the display unit is rotatably mounted on this hinge. In the notebook-type PC disclosed in Japanese Laid-open Patent Publication No. 2001-125668, if the display unit is tilted to a body unit side when the hinge is positioned at a rear end of the body unit, the display surface is hidden inside. If the display unit is tilted to the body unit side when the hinge is positioned at a front end of the body unit, the display surface appears outside. That is, a tablet PC style in which the display surface is exposed as being laid on the body unit and a notebook PC style in which the display surface is tiltable at the rear of the body unit are selectively used.

Japanese Laid-open Patent Publication No. 2002-55736 discusses an electronic device in which, since the display surface of the display unit appears on a front side with the body unit and the display unit superposed each other for closing, a thin lid is further mounted on the display surface to protect the display surface. In the electronic device disclosed in the Japanese Laid-open Patent Publication No. 2002-55736, a fixing shaft provided at a front end of the display unit is movable along a sliding rail of the body unit, and a rotary encoder provided to the body unit and a rotating hinge provided at the center of the display unit are coupled together by a link arm. When the display unit is pulled up, the link arm is raised, and the fixing shaft moves in the sliding rail, thereby causing the display unit to be tilted as sliding in a rear direction of the body unit. By fixing the link arm at a plurality of angles by a latch mechanism of the rotary encoder, the tilt angle of the display unit can be set at a plurality of degrees.

SUMMARY

According to an aspect of the invention, a tilt mechanism for an information device including a body unit and a display unit, the tilt mechanism being capable of changing a tilt angle of the display unit after the display unit is tilted on the body unit by pulling up an upper end of the display unit laid on the body unit and sliding a lower end of the display unit over the body unit, the tilt mechanism includes a running roller provided at the lower end of the display unit, a rotating shaft support unit provided on an upper surface of the body unit and configured to rotatably engage a rotating shaft of the running roller, a first link mounted on the body at one end of the first link so as to rotate by using a first rotating shaft, the first link including a first engaging unit at the other end of the first link, a second link mounted on the display unit at one end of the second link so as to rotate by using a second rotating shaft, the second link including a second engaging unit at the other end of the second link, and a link mechanism configured to maintain an engaging state in which the first engaging unit and the second engaging unit are engaged together until the rotating shaft of the running roller is engaged with the rotating shaft support unit by pulling up the display unit from a state of being laid on the body unit, and configured to be deformable so that a distance between the first rotating shaft and the second rotating shaft is shortened by releasing the engaging state of the first engaging unit and the second engaging unit after the rotating shaft of the running roller is engaged with the rotating shaft support unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a side view for describing the locked state of an example of an engagement structure of a first link and a second link in the link mechanism of the first example of the first embodiment depicted in FIG. 1A to FIG. 1C and FIG. 2A and FIG. 2B, and FIG. 3B is a side view for describing the unlocked state of the example of the engagement structure of the first link and the second link;

DESCRIPTION OF EMBODIMENTS

Figure 1A:
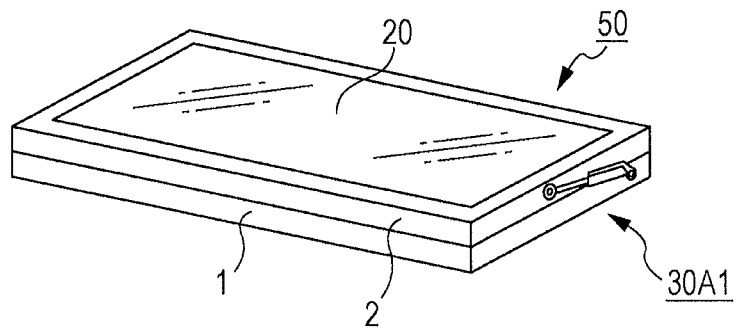
FIG. 1A is a perspective view depicting an outer appearance of an information device including a link mechanism according to a first example of a first embodiment.

In the electronic device disclosed in Japanese Laid-open Patent Publication No. 2002-55736, when the tilt angle of the display unit is changed after the display unit is tilted from the body unit, the lower end of the display unit is moved to front, and therefore the length of the keyboard in a depth direction is disadvantageously shortened to decrease operability. Also, a space between the lower end position of the display unit when the display unit is raised at a maximum and the keyboard may appear or be hidden by a tilt angle changing operation of the display unit. Thus, a small display unit, an operation button, or the like is not placed in that space, thereby making it difficult to effectively use this space.

It is preferable to provide a tilt mechanism for an information device including a body unit and a display unit, the tilt mechanism capable of, from a state in which the display unit is laid on the body unit, sliding and tilting the display unit simultaneously over the body unit so that the display unit becomes in a tilted state and capable of changing a tilt angle after completion of the tilting operation without moving a lower end of the display unit.

Hereinafter, embodiments are described in detail by using the attached drawings based on specific examples. To facilitate understanding of the structure, the same reference numeral is provided for description to members having the same function even when the members have different shapes.

FIG. 1A is a perspective view depicting an outer appearance of an information device 50 including a link mechanism 30A1, hereinafter simply referred to as a link mechanism 30A1, according to a first example of a first embodiment. The information device 50 includes a body unit 1 as a first casing and a display unit 2 as a second casing. The display unit 2 is provided with a touch-panel-equipped display 20. With the display unit 2 laid on the body unit 1, the touch-panel-equipped display 20 is exposed to a front surface of the display unit 2. On a side surface of both of the body unit 1 and the display unit 2 superposed each other, a link mechanism 30A1 that tilts the display unit 2 from the body unit 1 is provided. Note in the following description that a side where a user uses the information device 50 is assumed to be a front side of the information device 50.

Figure 1B:
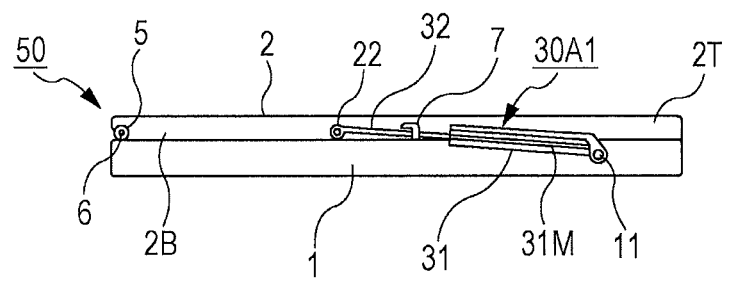
FIG. 1B is a side view of the information device depicted in FIG. 1A.

As depicted in FIG. 1B, the link mechanism 30A1 includes a body unit side link 31 as a first link and a display unit side link 32 as a second link. The body unit side link 31 has one end rotatably mounted on a side surface of the body unit 1 on a rear side by a first rotating shaft 11, and the other end having an engaging unit that engages with the display unit side link 32. On the other hand, the display unit side link 32 has one end rotatably mounted on a side surface of the display unit 2 on a front side by a second rotating shaft 22, and the other end having an engaging unit that engages with the body unit side link 31. In the link mechanism 30A1, the engaging unit of the display unit side link 32 is inserted in a groove 31M provided in the body unit side link 31.

The engaging units of the body unit side link 31 and the display unit side link 32 in the link mechanism 30A1 are normally fixed by a lock mechanism (not depicted) so as not to move. Therefore, the distance between the first rotating shaft 11 and the second rotating shaft 22 in the link mechanism 30A1 is uniform unless the lock mechanism is unlocked. Also, a running roller 5 mounted on a tilt rotating shaft 6 is provided at a lower end 2B of the display unit 2 on a lower side when tilted. On an upper surface of the body unit 1, a rotating shaft support unit 7 is provided that engages with the tilt rotating shaft 6 to stop the movement of the tilt rotating shaft 6 when the running roller 5 moves over the surface of the body unit 1.

Figure 1C:
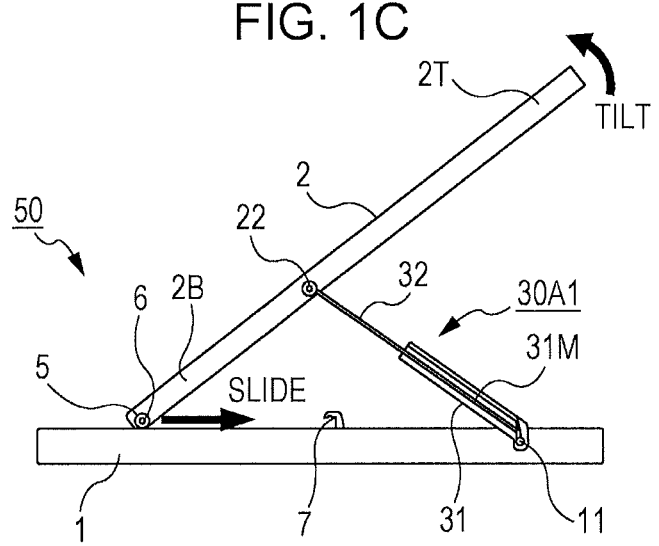
FIG. 1C is a side view depicting the state in which a display unit starts to be tilted by the link mechanism from a body unit.

When the display unit 2 is tilted with respect to the body unit 1, as depicted in FIG. 1C, an upper end 2T of the display unit 2 is pulled up to cause the display unit 2 to perform a sliding and tilting operation with respect to the body unit 1 by the link mechanism 30A1. When the display unit 2 starts a sliding and tilting operation, the body unit side link 31 of the link mechanism 30A1 rotates about the first rotating shaft 11, and the display unit side link 32 rotates about the second rotating shaft 22. Then, when the running roller 5 at the lower end 2B of the display unit 2 runs over the body unit 1, the lower end 2B makes a sliding movement. As the running roller 5 runs over the body unit 1, the upper end 2T of the display unit 2 is gradually tilted. Here, the distance between the first rotating shaft 11 and the second rotating shaft 22 in the link mechanism 30A1 is unchanged.

Figure 2A:
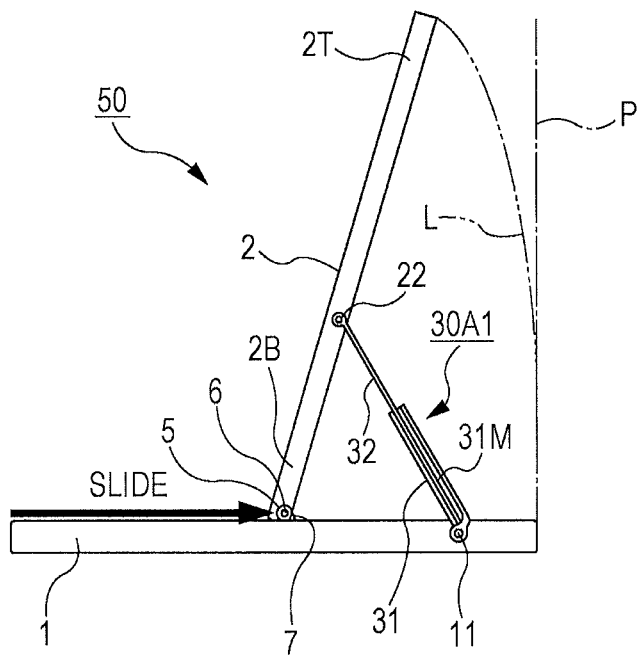
FIG. 2A is a side view depicting the state in which the display unit is further tilted from the state depicted in FIG. 1C to complete the tilting operation.

FIG. 2A depicts the state in which the display unit 2 is further tilted from the state depicted in FIG. 1C and the tilt rotating shaft 6 of the running roller 5 is engaged with the rotating shaft support unit 7 to complete the tilting operation. According to the operation of the link mechanism 30A1, a locus L of the upper end 2T of the display unit 2 moving until the display unit 2 is tilted from the body unit 1 to complete the tilting operation does not go beyond a rear side of a perpendicular P standing at an end of the body unit 1 on a rear side, as depicted in FIG. 2A. Therefore, in the information device 50 having the link mechanism 30A1 mounted thereon, it is possible to tilt the display unit 2 even in a place without a space on the rear side of the body unit 1.

Figure 2B:
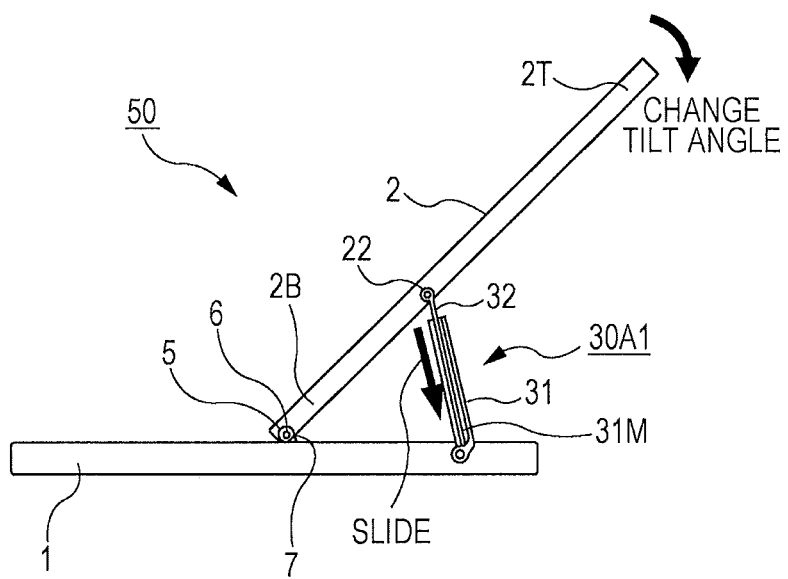
FIG. 2B is a side view depicting the state in which the tilt angle of the display unit is changed by a sliding mechanism from the state depicted in FIG. 2A.

On the other hand, in the information device 50 having the link mechanism 30A1 mounted thereon, in a place with a space on the rear side of the body unit 1, it is possible to change the tilt angle of the display unit 2 without moving the position of the lower end 2B of the display unit 2. This operation is described by using FIG. 2B. As depicted in FIG. 2A, in the state in which tilting of the display unit 2 is completed, the tilt rotating shaft 6 of the running roller 5 is engaged with the rotating shaft support unit 7. In this state, when the lock mechanism (not depicted) for the engaging units of the body unit side link 31 and the display unit side link 32 is released, the display unit side link 32 slides in the groove 31M provided in the body unit side link 31. As a result, a portion of the display unit side link 32 accommodated in the groove 31M is increased. Then, the distance between the first rotating shaft 11 and the second rotating shaft 22 is shortened and, as depicted in FIG. 2B, the display unit 2 rotates about the tilt rotating shaft 6, thereby allowing the tilt angle to be changed.

FIG. 3A depicts an example of the structure of the engaging units of the body unit side link 31 and the display unit side link 32 in the link mechanism 30A1 depicted in FIG. 1A to FIG. 1C, FIG. 2A, and FIG. 2B. On the body unit side link 31, a lock mechanism 60 is mounted. The lock mechanism 60 includes a slide rod 61, and this slid rod 61 is provided with a through hole 62. The slide rode 61 is able to move in a direction perpendicular to the body unit side link 31. In a locked state, the position of the through hole 62 does not match the position of the groove 31M in the body unit side link 31. For this reason, the display unit side link 32 is unable to move into the groove 31M any more because of the slide rod 61. Also, on a side of the body unit side link 31 closer to the display unit side link 32 than the lock mechanism 60, a holding spring 34 is provided that regulates the movement speed of the display unit side link 32 in the groove 31M of the body unit side link 31.

FIG. 3B depicts the state in which a projection of the slide rod 61 of the lock mechanism 60 depicted in FIG. 3A is pushed and the slid rod 61 moves to cause the position of the through hole 62 and the position of the groove 31M in the body unit side link 31 to match each other. In this state, a tip of the display unit side link 32 passes through the through hole 62, and therefore it is possible to move the display unit side link 32 into the groove 31M of the body unit side link 31. Note that, as described above, with the pressing force of the holding spring 34, the display unit side link 32 is unable to quickly move in the groove 31M of the body unit side link 31.

Figure 4A:
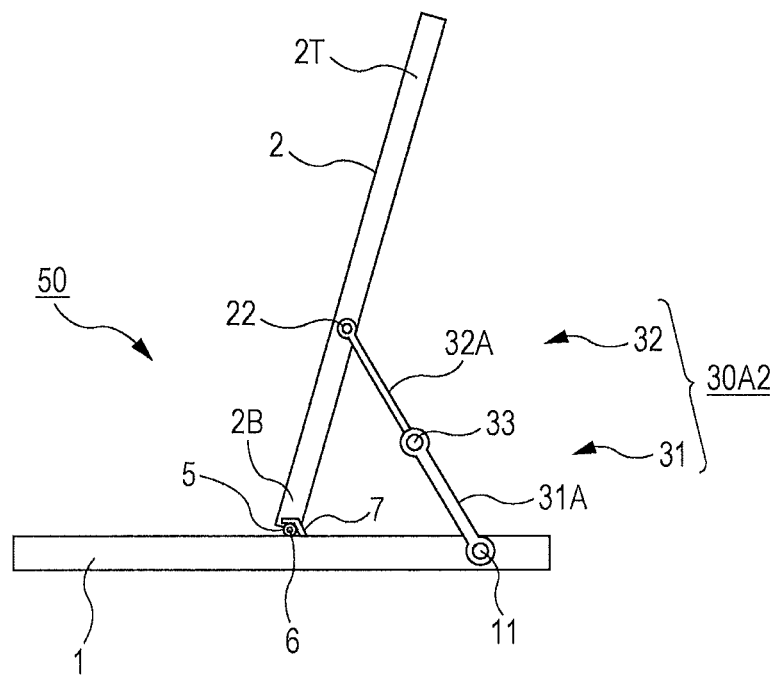
FIG. 4A is a side view depicting the state in which the tilting operation of the display unit is completed by a link mechanism of a second example of the first embodiment.

FIG. 4A is a side view depicting the state in which the tilting operation of the display unit 2 is completed in the information device 50 including a link mechanism 30A2, hereinafter simply referred to as a link mechanism 30A2, of a second example of the first embodiment. The structure of the information device 50 except the link mechanism 30A2 is identical to that of the information device 50 including the link mechanism 30A1. The link mechanism 30A2 includes the body unit side link 31 as the first link and the display unit side link 32 as the second link. The body unit side link 31 includes one end rotatably mounted on a side surface of the body unit 1 on a rear side by the first rotating shaft 11, and the other end having the engaging unit that engages with the display unit side link 32. On the other hand, the display unit side link 32 includes one end rotatably mounted on a side surface of the display unit 2 on a front side by the second rotating shaft 22, and the other end having the engaging unit that engages with the body unit side link 31. In the link mechanism 30A2, the engaging unit of the body unit side link 31 and the engaging unit of the display unit side link 32 are coupled together by a third rotating shaft 33.

The engaging units of the body unit side link 31 and the display unit side link 32 are coupled together by the third rotating shaft 33. This coupling part is normally fixed by a lock mechanism (not depicted) so as not to rotate. Therefore, the distance between the first rotating shaft 11 and the second rotating shaft 22 in the link mechanism 30A2 is uniform unless the lock mechanism is unlocked. Also, the running roller 5 mounted on the tilt rotating shaft 6 is provided at the lower end 2B of the display unit 2. On the upper surface of the body unit 1, the rotating shaft support unit 7 is provided that engages with the tilt rotating shaft 6 to stop the movement of the tilt rotating shaft 6 when the running roller 5 moves over the surface of the body unit 1.

FIG. 4A depicts the state in which the upper end 2T of the display unit 2 is pulled up with respect to the body unit 1 to cause the display unit 2 to perform a sliding and tilting operation with respect to the body unit 1 by the link mechanism 30A2 to tilt the display unit 2. The distance between the first rotating shaft 11 and the second rotating shaft 22 in the link mechanism 30A2 is unchanged when the display unit 2 is caused to perform a sliding and tilting operation with respect to the body unit 1.

Figure 4B:
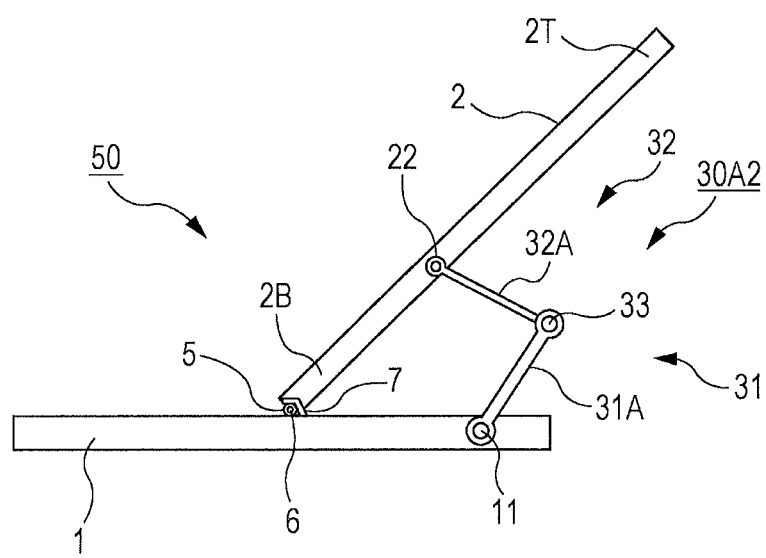
FIG. 4B is a side view depicting the state in which the tilt angle of the display unit is changed by a mid-folding mechanism from the state depicted in FIG. 4A.

In the state depicted in FIG. 4A, when the lock mechanism provided for the engaging units of the body unit side link 31 and the display unit side link 32 is released, the engaging units of the body unit side link 31 and the display unit side link 32 becomes rotatable by the third rotating shaft 33. Therefore, in this state, when the engaging units of the body unit side link 31 and the display unit side link 32 are moved to the rear side of the information device 50, the link mechanism 30A2 is folded in the middle, thereby shortening the distance between the first rotating shaft 11 and the second rotating shaft 22. As a result, as depicted in FIG. 4B, the display unit 2 rotates about the tilt rotating shaft 6, thereby allowing the tilt angle to be changed. In this case, it is sufficient to provide the coupling part including the third rotating shaft 33 with a mechanism that suppresses the rotation of the display unit side link 32 with respect to the body unit side link 31 or a mechanism that causes the rotation of the display unit side link 32 in a stepwise manner.

Figure 5A:
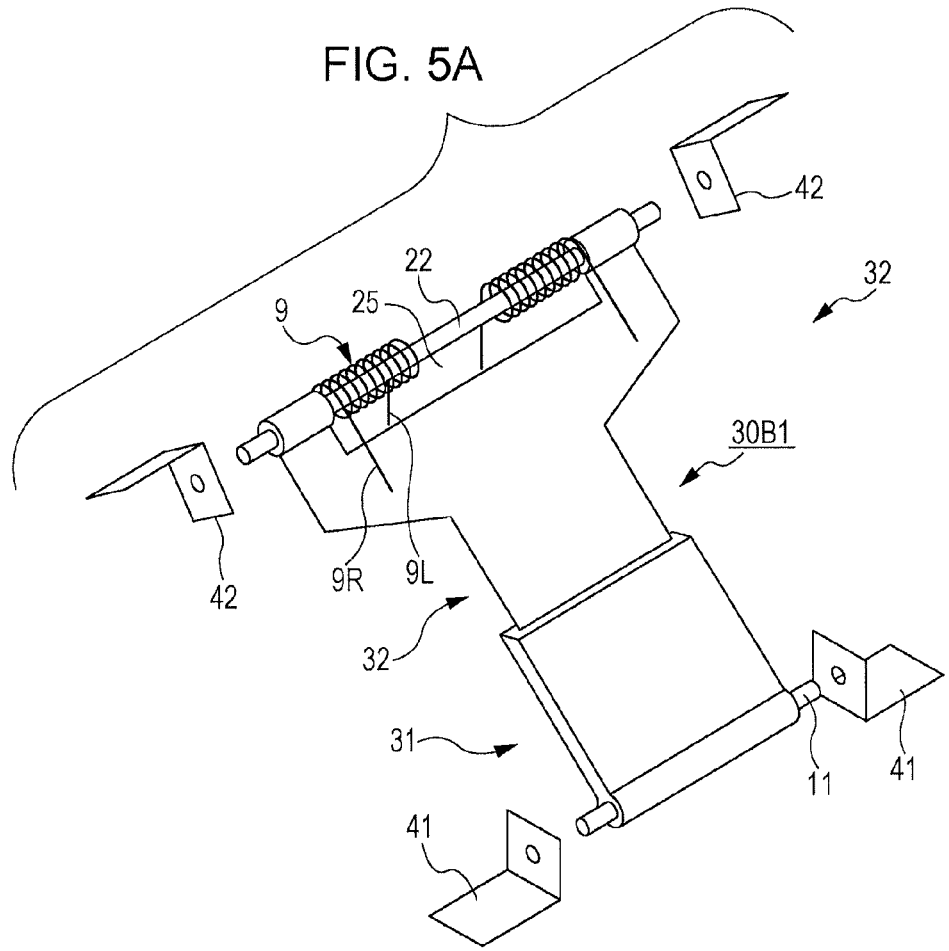
FIG. 5A is an exploded perspective view depicting the structure of the link mechanism of the second embodiment mounted on an information device.

Next, a link mechanism of a second embodiment is described. The link mechanisms 30A1 and 30A2 of the first embodiment are each mounted on a side surface of both of the body unit 1 and the display unit 2. The link mechanism of the second embodiment is mounted between the upper surface of the body unit 1 and the rear surface of the display unit 2. FIG. 5A is an exploded perspective view depicting the structure of a link mechanism 30B1, hereinafter simply referred to as a link mechanism 30B1, of a first example of the second embodiment mounted on the information device.

The link mechanism 30B1 includes a body unit side link 31 including a first rotating shaft 11 on a body unit side, a display unit side link 32 including a second rotating shaft 22 on a display side, first brackets 41, second brackets 42, and assist springs 9 as a pressing unit. In this example, two assist springs 9 are mounted on the second rotating shaft 22. In the second embodiment, the body unit side link 31 has a flat plate shape, and includes members on both sides in a width direction, the members accepting a free end of the display unit side link 32, which will be described further below. The display unit side link 32 includes the free end accommodated in the body unit side link 31 and a side including the second rotating shaft 22 widened to be provided with a notch 25 at the center.

The second rotating shaft 22 is provided across this notch 25, and includes both ends axially supported by second brackets 42. The second rotating shaft 22 positioned in the notch 25 penetrates through the two assist springs 9, and the second brackets 42 axially supporting the second rotating shaft 22 are mounted on the display unit 2. Also, the first rotating shaft 11 is axially supported by the first brackets 41, and the first brackets 41 are mounted on the body unit 1. The shapes of the body unit side link 31 and the display unit side link 32 are not restricted to the shapes of the present example.

Figure 5B:
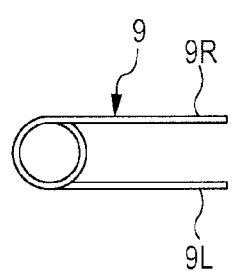
FIG. 5B is a plan view depicting a spring for use in the link mechanism depicted in FIG. 5A.
Figure 5C:
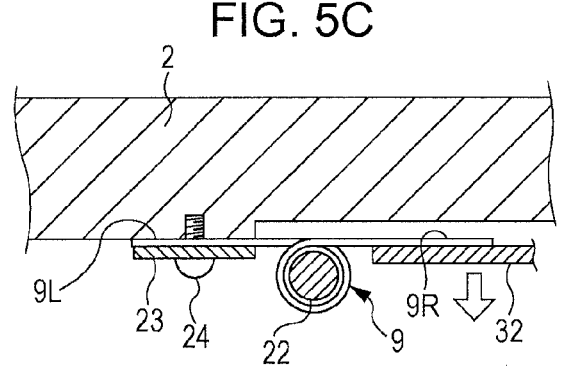
FIG. 5C is an exploded sectional view depicting the state in which the spring depicted in FIG. 5B is mounted on the display unit and the link mechanism.

As the assist spring 9, a twisted or torsional spring as depicted in FIG. 5B may be used. The assist spring 9 includes two legs 9L and 9R. As depicted in FIG. 5C, the assist spring 9 has one leg 9L fixed to the display unit 2 with a holding plate 23 and a screw 24. The other leg 9R of the assist spring 9 is open in a direction away from the leg 9L, and is engaged with a surface of the display unit side link 32 on a display unit 2 side. Therefore, the leg 9R of the assist spring 9 provides the display unit side link 32 with a force as indicated by an arrow trying to return to a leg 9L side of the assist spring 9. The state depicted in FIG. 5C is the state of the display unit side link 32 with the display unit 2 laid on the body unit 1, where the legs 9L and 9R of the assist spring 9 are in a wide open state. The direction indicated by the arrow described above is a direction in which the second rotating shaft 22 of the display unit side link 32 goes away from the body unit omitted in FIG. 5C, that is, a direction in which the display unit 2 goes away from the body unit.

Figure 6A:
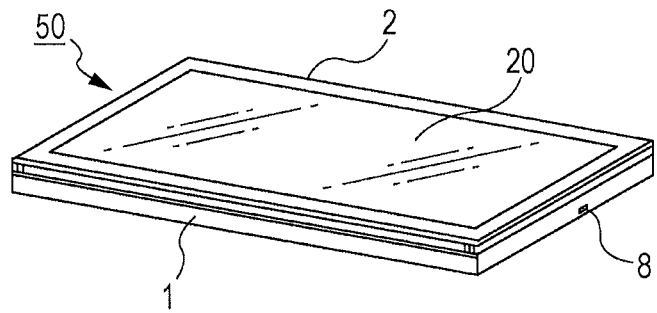
FIG. 6A is a perspective view depicting the state in which the information device including the link mechanism of the second embodiment is closed.
Figure 7A:
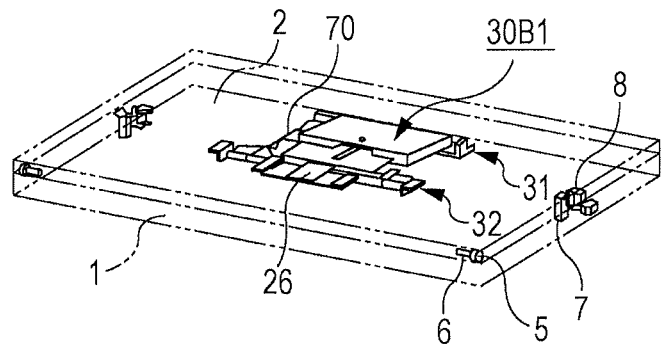
FIG. 7A is a skeleton view of the information device, depicting mount positions of the link mechanism, a running roller, a sliding and lock mechanism and a close lock mechanism of the first example of the second embodiment mounted on the information device depicted in FIG. 6A.
Figure 8A:
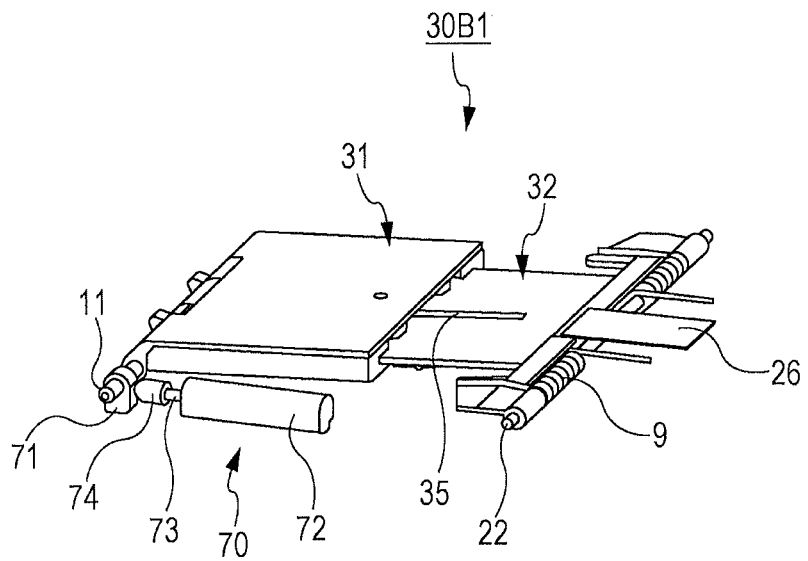
FIG. 8A is a perspective view depicting the state of the link mechanism of the first example of the second embodiment together with a damper mechanism in an enlarged manner when the display unit is closed with respect to the body unit.

FIG. 6A is a perspective view depicting the state in which the information device 50 including the link mechanism 30B1 between the body unit 1 and the display unit 2 is closed, and FIG. 7A is a skeleton view of FIG. 6A. FIG. 8A is a perspective view depicting only the link mechanism 30B1 of FIG. 7A as being enlarged and depicting the state in which the link mechanism 30B1 is closed. As depicted in FIG. 6A, on the upper surface of the display unit 2 laid on the body unit 1, a touch-panel-equipped display 20 is provided. Also, as depicted in FIG. 7A, an electrical connection between the body unit 1 and the display unit 2 is made by a flexible printed circuit (FPC) 26 placed inside the link mechanism 30B1. Furthermore, a damper mechanism 70 is provided laterally near the link mechanism 30B1. The damper mechanism 70 will be described further below.

With the link mechanism 30B1 provided between the body unit 1 and the display unit 2, the second rotating shaft 22 of the display unit side link 32 is pressed by the assist springs 9 in a direction away from the body unit 1, and therefore the display unit 2 is pressed in a direction opening from the body unit 1. For this reason, a close lock mechanism 8 is provided between the body unit 1 and the display unit 2 as depicted in FIG. 6A and FIG. 7A. With the display unit 2 laid on the body unit 1 of the information device 50, the display unit 2 does not open from the body unit 1. The structure of the close lock mechanism 8 will be described further below.

When the close lock mechanism 8 is unlocked with the display unit 2 laid on the body unit 1 of the information device 50 depicted in FIG. 6A and FIG. 7A, the display unit 2 starts to be opened by the link mechanism 30B1 from the body unit 1. When the display unit 2 is opened from the body unit 1, as in a perspective view depicted in FIG. 6B and a skeleton view depicted in FIG. 7B, the display unit 2 automatically slides by the link mechanism 30B1 with respect to the body unit 1 to start tilting. Here, the running roller 5 provided at the lower end 2B of the display unit 2 runs over the upper surface of the body unit 1, and the upper end 2T of the display unit 2 is gradually tilted with respect to the body unit 1.

Figure 6B:
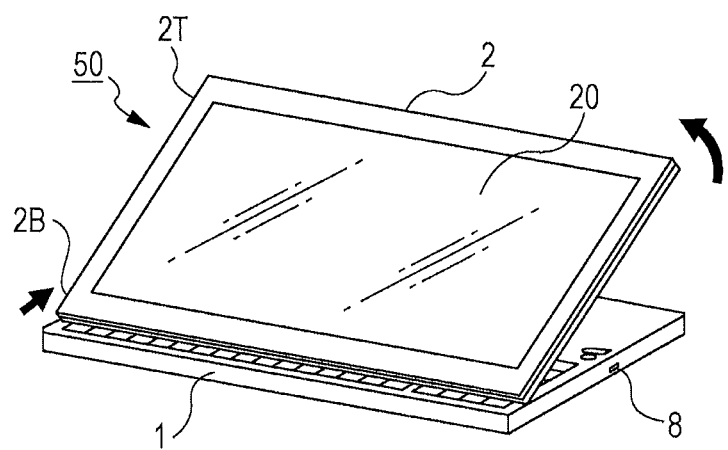
FIG. 6B is a perspective view depicting the state in which the display unit of the information device depicted in FIG. 6A starts a sliding and tilting operation from the body unit.
Figure 6C:
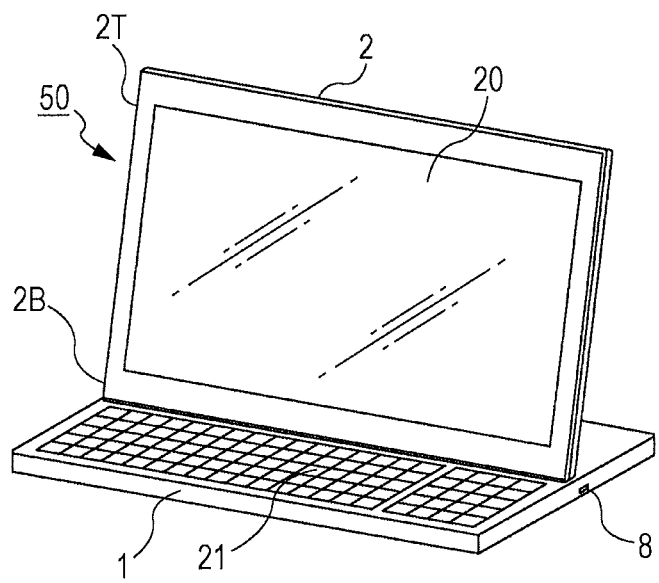
FIG. 6C is a perspective view depicting the state in which the display unit further performs a sliding and tilting operation from the state depicted in FIG. 6B to complete the sliding and tilting operation.
Figure 7B:
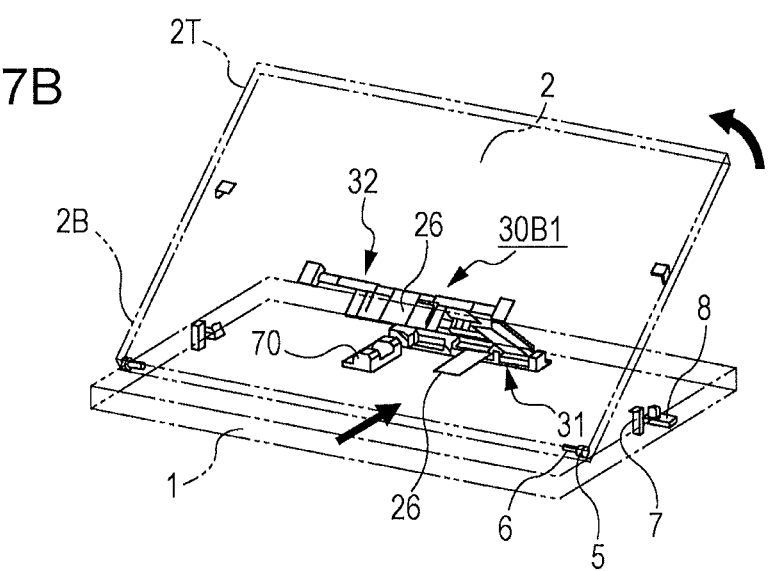
FIG. 7B is a skeleton view of the information device corresponding to the state of FIG. 6B, depicting operation states of the link mechanism, the running roller, the sliding and lock mechanism, and the close lock mechanism of the first example of the second embodiment when the display unit starts a sliding and tilting operation from the state depicted in FIG. 7A.
Figure 7C:
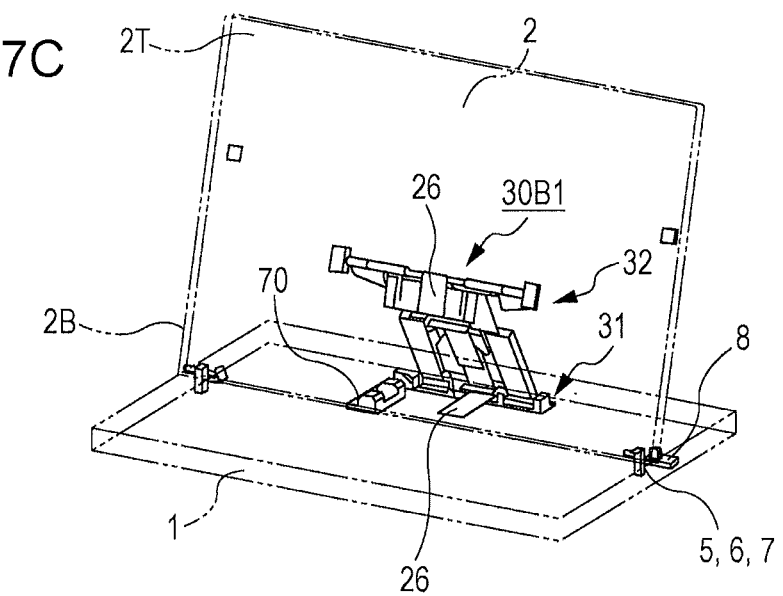
FIG. 7C is a skeleton view of the information device corresponding to the state of FIG. 6C, depicting operation states of the link mechanism, the running roller, the sliding and lock mechanism, and the close lock mechanism of the first example of the second embodiment when the display unit further performs a sliding and tilting operation from the state depicted in FIG. 7B to complete the sliding and tilting operation.
Figure 8B:
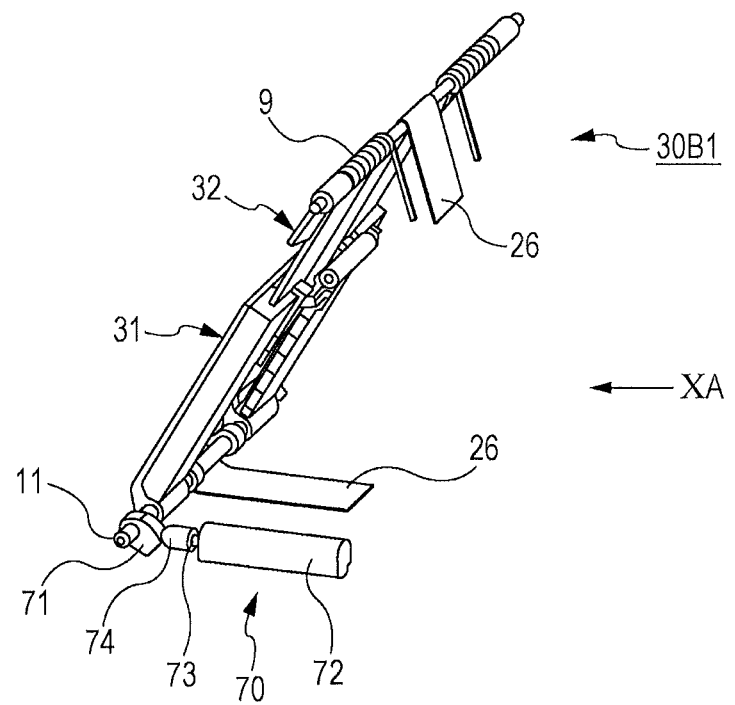
FIG. 8B is a perspective view of the state of the link mechanism of the first example of the second embodiment together with the damper mechanism when the display unit completes a sliding and tilting operation with respect to the body unit.

When the running roller 5 provided at the lower end 2B of the display unit 2 further runs over the upper surface of the body unit 1 from the state depicted in FIG. 6B and FIG. 7B, the state becomes as depicted in a perspective view of FIG. 6C and a skeleton view of FIG. 7C. FIG. 8B is a perspective view depicting only the link mechanism 30B1 of FIG. 7C as being enlarged. In this state, as depicted in FIG. 7C, the rotating shaft 6 of the running roller 5 at the lower end 2B of the display unit 2 is engaged with the rotating shaft support unit 7, and the lower end 2B of the display unit 2 does not slide over the body unit 1 any more, thereby completing the sliding and tilting operation of the display unit 2. When the sliding and tilting operation of the display unit 2 is completed, a keyboard 21 appears on the upper surface of the body unit 1 as depicted in FIG. 6C. Also, as will be understood from FIG. 7A to FIG. 7C, the FPC 26 placed along the link mechanism 30B1 is deformed according to the change of the state of the link mechanism 30B1.

In the information device 50 including the link mechanism 30B1 between the body unit 1 and the display unit 2, as depicted in FIG. 6A to FIG. 6C and FIG. 7A to FIG. 7C, when the close lock mechanism 8 is pressed, the lock state between the body unit 1 and the display unit 2 is released. When the lock state between the body unit 1 and the display unit 2 is released, the lower end 2B of the display unit 2 slides over the body unit 1 with the pressing force of the assist springs 9 to cause the upper end 2T to be open from the body unit 1 to become in a tilted state. Here, by providing the link mechanism 30B1 with the damper mechanism 70 depicted in FIG. 7A to FIG. 7C, the display unit 2 gradually opens from the body unit 1 to become in a tilted state. This damper mechanism 70 is described by using FIG. 8A and FIG. 8B.

As depicted in FIG. 8A, the damper mechanism 70 includes a damper cam 71 fixed to the first rotating shaft 11 of the body unit side link 31, a damper 72, a retractable rod 73, and a contact 74. The contact 74 is mounted at a tip of the retractable rod 73, and abuts on an outer circumferential surface of the damper cam 71 from the time when the display unit 2 is closed to the time when the sliding and tilting operation is completed. A portion of the outer circumferential surface of the damper cam 71 abutting on the contact 74 is formed so that the distance from the first rotating shaft 11 is a minimum when the display unit 2 is closed and a maximum when the display unit 2 completes tilting. When pressed, the contact 74 causes the retractable rod 73 to retract into the damper 72. The inside of the damper 72 is filled with oil. With this oil, the damper 72 lets the retractable rod 73 enter the inside of the damper 72 at a slow speed. Also, the damper 72 discharges the retractable rod 73 at a slow speed when the retractable rod 73 goes out of the damper 72.

When the display unit 2 performs a sliding and tilting operation from the state depicted in FIG. 8A, the first rotating shaft 11 rotates to cause the body unit side link 31 to rise, and the damper cam 71 rotates accordingly. When the damper cam 71 rotates, the distance between the portion abutting on the contact 74 and the first rotating shaft 11 is increased, and therefore the contact 74 is pressed to cause the retractable rod 73 to retract into the damper 72. However, with the action of the damper 72, the retracting speed of the contact 72 is suppressed. As a result, the rising speed of the body unit side link 31 is decreased, and the display unit 2 slowly performs a sliding and tilting operation. When the display unit 2 completes the sliding and tilting operation with respect to the body unit 1, the display unit 2 becomes in a state depicted in FIG. 8B. In this state, the retractable rod 73 is retracted into the damper 72 at a maximum.

Figure 9A:
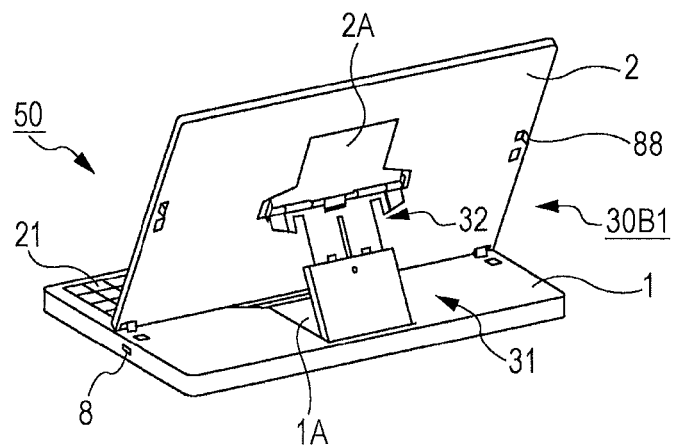
FIG. 9A is a perspective view of the information device including the link mechanism of the first example of the second embodiment when viewed from a back surface side, in the state in which the display unit completes a sliding and tilting operation.

FIG. 9A depicts the information device 50 when viewed from the rear side, in the state in which the display unit 2 completes the sliding and tilting operation with respect to the body unit 1. On the upper surface of the body unit 1 and the rear surface of the display unit 2, a recess 1A and a recess 2A are provided, respectively, to accommodate the link mechanism 30B1 when the display unit 2 is laid on the body unit 1.

Figure 9B:
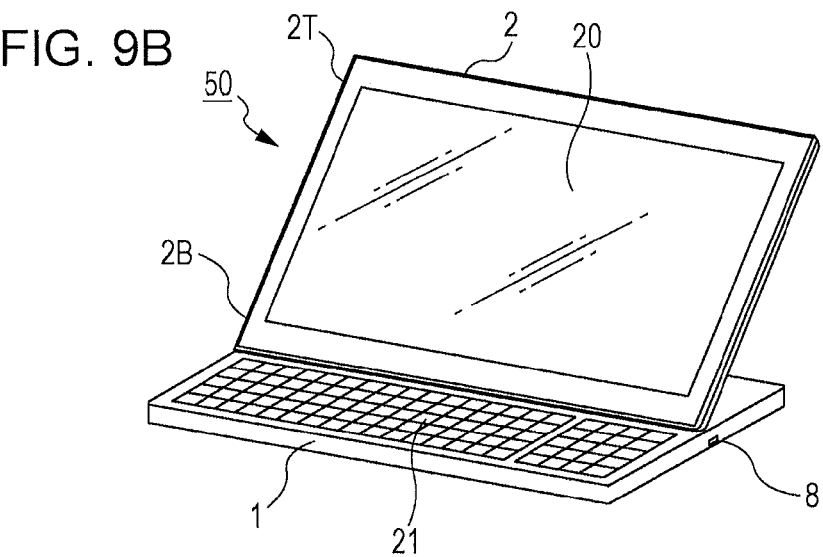
FIG. 9B is a perspective view of the information device depicting the state in which the tilt angle of the display unit is changed from the state in which the sliding and tilting operation is completed as depicted in FIG. 6C.
Figure 9C:
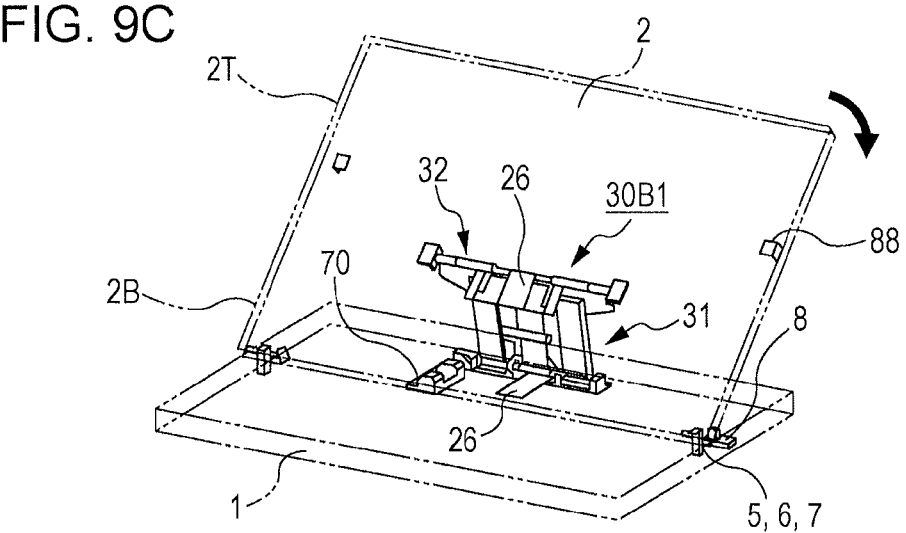
FIG. 9C is a skeleton view of the information device depicting an operation state of the link mechanism, the running roller, the sliding and lock mechanism, and the close lock mechanism of the first example of the second embodiment in the state depicted in FIG. 9B.

FIG. 9B depicts the state in which the tilt angle of the display unit 2 is changed at a maximum from the state in which the display unit 2 completes the sliding and tilting operation as depicted in FIG. 6C. FIG. 9C is a skeleton view of the information device 50 depicting the operation state of the link mechanism 30B1, the running roller 5 and the rotating shaft 6 thereof, and the rotating shaft support unit 7 in the state depicted in FIG. 9B. As will be understood from FIG. 9C, when the tilt angle of the display unit 2 is changed at a maximum, the display unit side link 32 of the link mechanism 30B1 is laid on the body unit side link 31, and the full length of the link mechanism 30B1 is shortened.

Figure 10A:
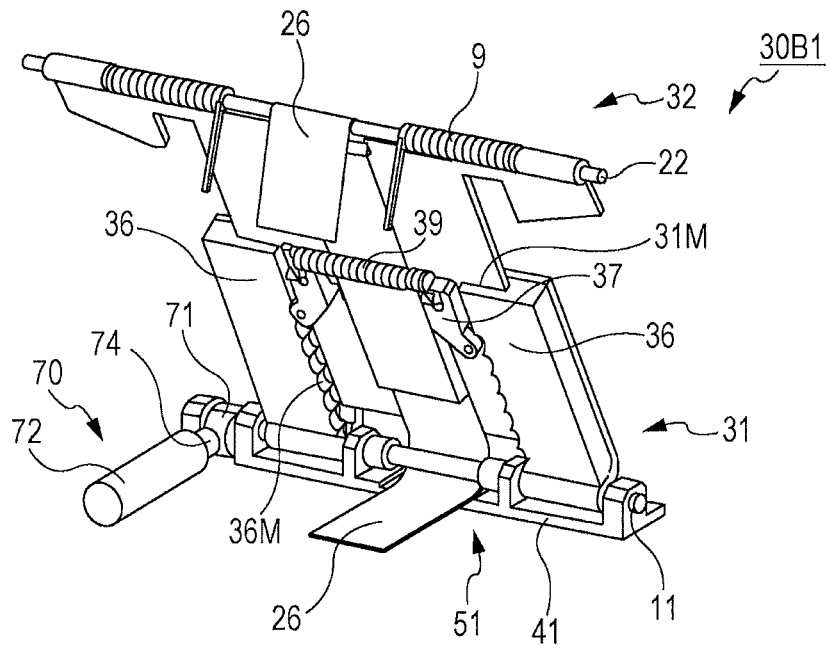
FIG. 10A is a perspective view of the state of FIG. 8B when viewed from an arrow XA direction.
Figure 10B:
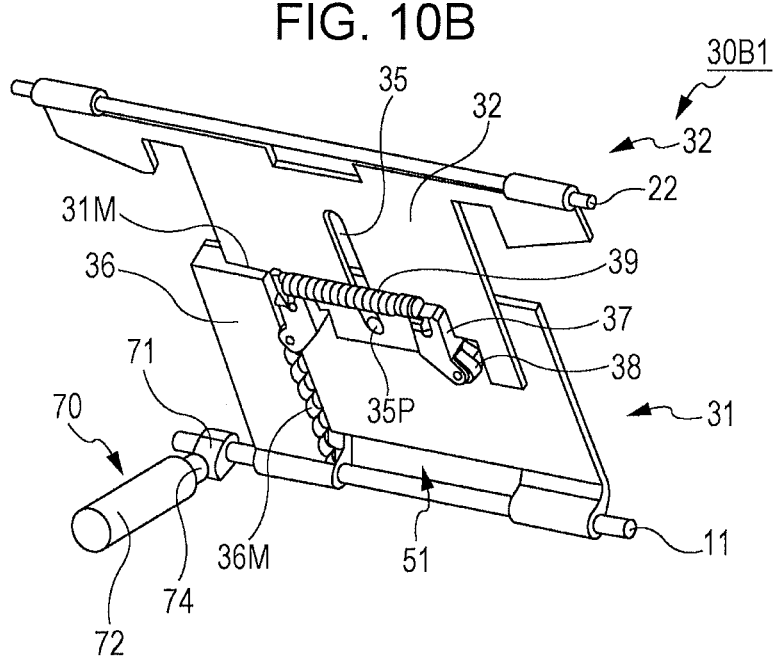
FIG. 10B is a perspective view depicting the internal structure of the link mechanism with components partially removed from FIG. 10A.
Figure 11A:
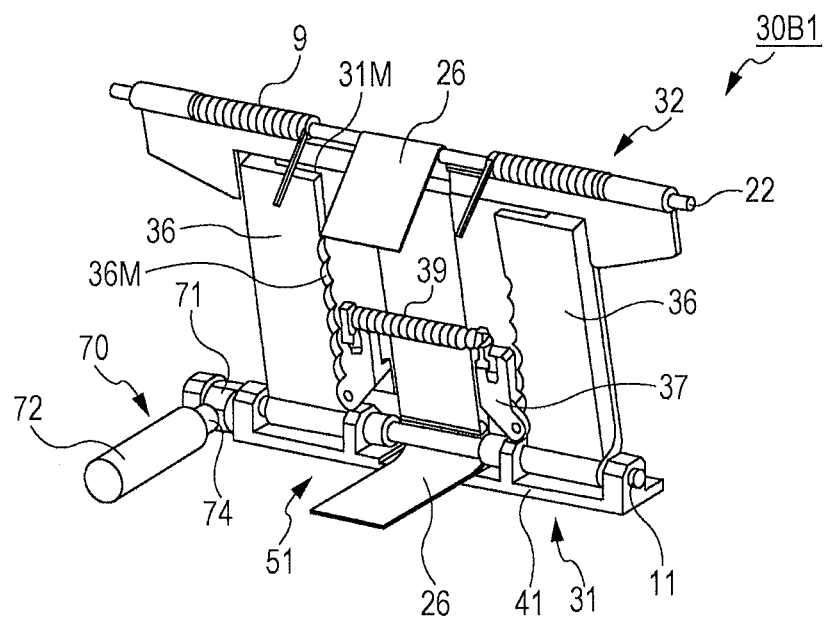
FIG. 11A is a perspective view when the tilt angle is changed after tilting of the display unit is completed with respect to the body unit from the state depicted in FIG. 10A.
Figure 11B:
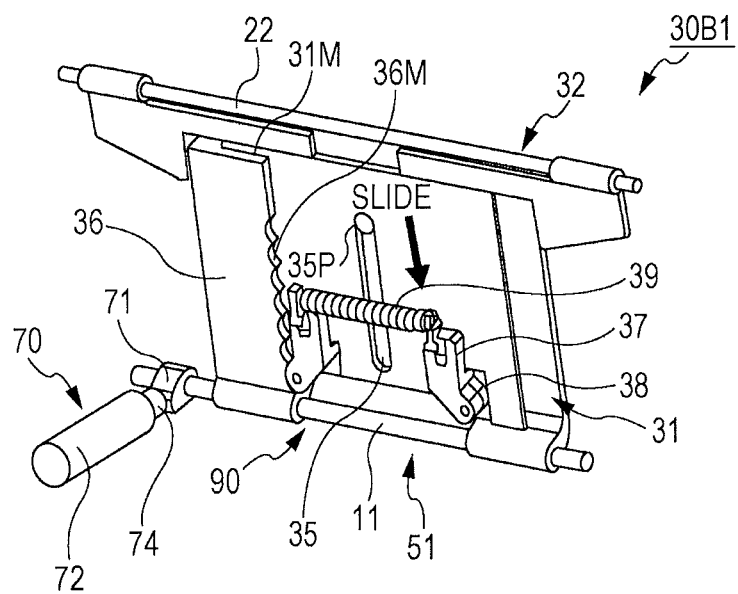
FIG. 11B is a perspective view depicting the internal structure of the link mechanism with components partially removed from FIG. 11A.
Figure 12A:
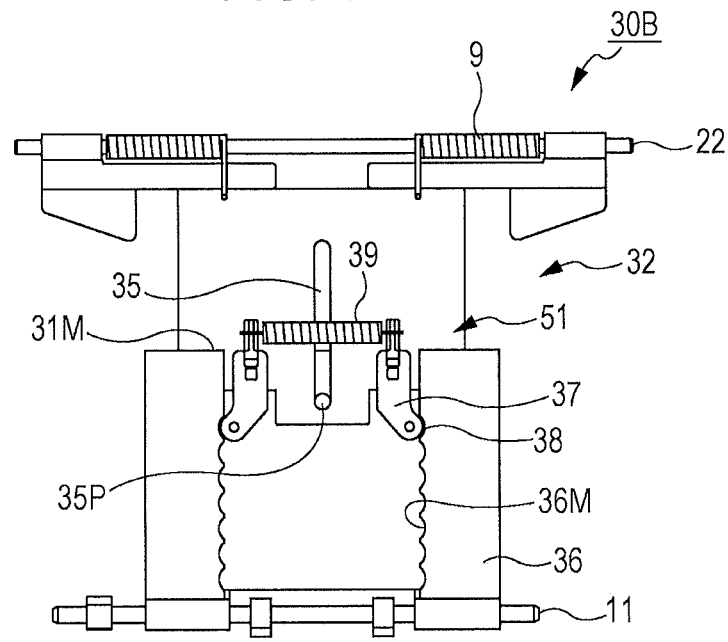
FIG. 12A is a diagram of the link mechanism depicted in FIG. 10A when viewed from a direction perpendicular to the link mechanism.
Figure 12B:
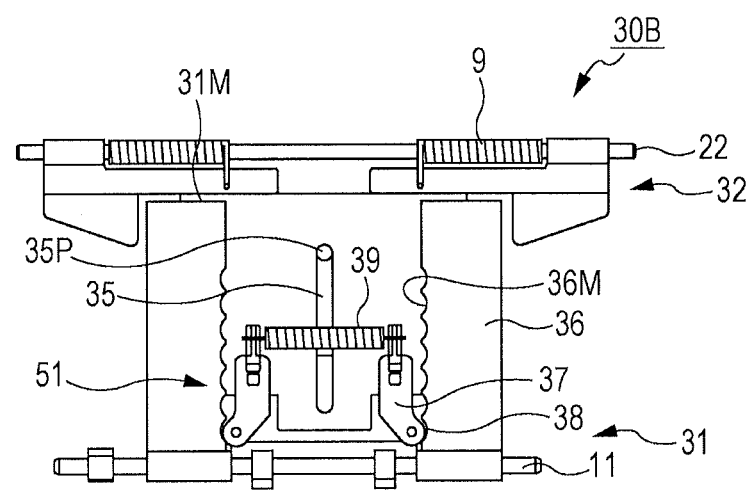
FIG. 12B is a diagram of the link mechanism depicted in FIG. 11A when viewed from a direction perpendicular to the link mechanism.

Here, the structure and operation of the link mechanism 30B1 are described by using FIG. 10A, FIG. 10B, FIG. 11A, FIG. 11B, FIG. 12A, and FIG. 12B. FIG. 10A, FIG. 10B, and FIG. 12A each depict the state in which the display unit 2 completes the sliding and tilting operation. FIG. 11A, FIG. 11B, and FIG. 12B each depict the state in which the tilt angle of the display unit 2 is changed at a maximum. FIG. 10B clarifies the internal structure with components partially removed from FIG. 10A, and FIG. 11B clarifies the internal structure with components partially removed from FIG. 11A.

As depicted in FIG. 10A, FIG. 10B, and FIG. 12A, the body unit side link 31 of the link mechanism 30B1 has a flat plate shape including a rotating shaft 11 axially supported by a first bracket 41, and slide guides 36 are set on both sides on a surface of the body unit side link 31 on a body unit side. Each slide guide 36 is provided with grooves 31M. In these grooves 31M, a free end of the display unit side link 32 is inserted. The display unit side link 32 is able to make a sliding movement in the grooves 31M to the body unit side. At the center of the display unit side link 32, a slit 35 is provided extending in a sliding direction of the display unit side link 32. At the center on a tip side of the body unit side link 31, a guide pin 35P is provided to project and fit in this slit 35. With the slit 35, the guide pin 35P, and the slide guides 36, the display unit side link 32 is able to make a sliding movement in the grooves 31M straight to the body unit side.

Also, the slit 35 and the guide pin 35P have a function of regulating the sliding amount of the display unit side link 32. That is, when the display unit side link 32 is pulled out from the body unit side link 31, and when the display unit 2 is raised too much, the free end of the display unit side link 32 comes off from the body unit side link 31 if the slit 35 and the guide pin 35P are not provided. On the other hand, if the slit 35 and the guide pin 35P are provided, when the display unit 2 is raised, the display unit 2 is not able to be raised when the guide pin 35P abuts on an end of the slit 35. As a result, when the display unit 2 is raised, the display unit side link 32 may not come off from the body unit side link 31.

Furthermore, between the body unit side link 31 and the display unit side link 32, a sliding amount adjusting mechanism 51 is provided to allow the sliding amount of the display unit side link 32 with respect to the body unit side link 31 to be adjusted in a stepwise manner. The sliding amount adjusting mechanism 51 includes a plurality of lock grooves 36M provided to each of the slide guides 36 of the body unit side link 31, lock levers 37 provided to the display unit side link 32, lock rollers 38, and a lock spring 39. The lock grooves 36M are provided at each of edges of the slide guides 36 facing each other, and are engaged with the lock roller 38 for positioning. The lock grooves 36M are shallow grooves. With application of an external force, the lock roller 38 is able to easily move from one lock groove 36M to another adjacent lock groove 36M.

Two lock levers 37 are each rotatably mounted on rotating shafts each projecting at an axisymmetric position with respect to a line dividing the display unit side link 32 on the display unit side link 32. Each lock roller 38 is rotatably mounted by a rotating shaft on a tip of the lock lever 37. With rotation of the lock lever 37, the lock roller 38 is engaged with the lock groove 36M. The lock spring 39 is an extension spring running between ends of the lock levers 37 on a side opposite to the lock rollers 38. By pulling the ends not provided with the lock rollers 38 of the lock levers 37 to each other, the lock spring 39 rotates the lock levers 37 to press the lock rollers 38 onto the lock grooves 36M.

After the sliding and tilting operation of the display unit 2 is completed with respect to the body unit 1, when the tilt angle of the display unit 2 is changed by using the sliding amount adjusting mechanism 51, an operation of holding an upper edge of the display unit 2 to lay down or raise the display unit 2 is performed. With this operation, the lock rollers 38 of the sliding amount adjusting mechanism 51 each go out of the lock groove 36M engaging therewith so far and move to one adjacent lock groove 36M or further adjacent lock groove 36M. Every time the lock rollers 38 each move to one adjacent lock groove 36M one by one from the position depicted in FIG. 10A, FIG. 10B, and FIG. 12A, the display unit side link 32 is accommodated in the body unit side link 31. Then, as an overlapping portion between the display unit side link 32 and the body unit side link 31 increases, the sliding amount of the display unit side link 32 is changed, and the tilt angle of the display unit 2 is changed.

The spring force of the lock spring 39 is set so that the lock rollers 38 do not come off from the lock grooves 36M with a touch force when the display unit 2 is touched by a finger but come off from the lock grooves 36M when the upper edge of the display unit 2 is held to move. That is, the spring force is set so that the lock rollers 38 come off from the lock grooves 36M with an operation force for changing the tilt angle of the display unit 2.

FIG. 11A, FIG. 11B, and FIG. 12B each depict the state in which the lock rollers 38 move to the lock grooves 36M nearest to the first rotating shaft 11 from the position depicted in FIG. 10A, FIG. 10B, and FIG. 12A. That is, when the link mechanism 30B1 is in the state depicted in FIG. 11A, FIG. 11B, and FIG. 12B, the information device 50 becomes in the state depicted in FIG. 9B and FIG. 9C. As such, the information device 50 including the link mechanism 30B1 is able to smoothly make a transition from a closed state to a tilted state and perform a tilt angle changing operation from a tilted state.

Figure 13A:
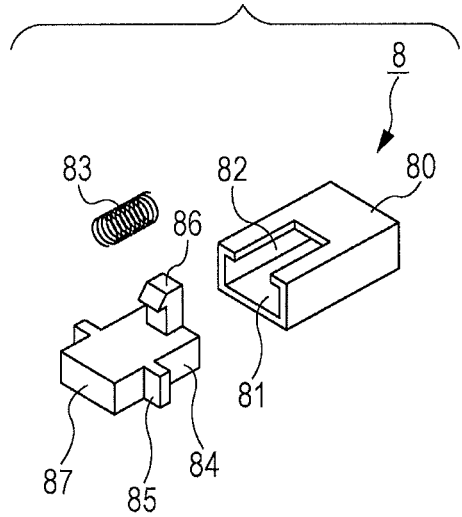
FIG. 13A is an exploded perspective view depicting the structure of an example of a close lock mechanism that engages the display unit with the body unit.

FIG. 13A depicts, in an exploded manner, the structure of an example of the close lock mechanism 8 that engages the display unit 2 with the body unit 1. The close lock mechanism 8 includes a hollow case 80, and the case 80 includes one end provided with an opening 81. Also, on an upper surface of the case 80, an upper surface opening 82 that communicates with the opening 81 is provided. Inside this case 80, a sliding member 84 is inserted after a spring 83 is inserted from the opening 81. Stoppers 85 are provided on both side surfaces of the sliding member 84 so as to project therefrom. The sliding member 84 is able to be pressed into the case 80 until these stoppers 85 abut on an edge of the opening 81. Furthermore, a lock projection 86 is provided on an upper surface of an end of the sliding member 84 on a side away from the stoppers 85. The lock projection 86 is inserted in the upper surface opening 82 when the sliding member 84 is inserted in the case 80. In the above-structured close lock mechanism 8, an end face of the sliding member 84 on a side provided with the stoppers 85 serves as a lock release button 87.

Figure 13B:
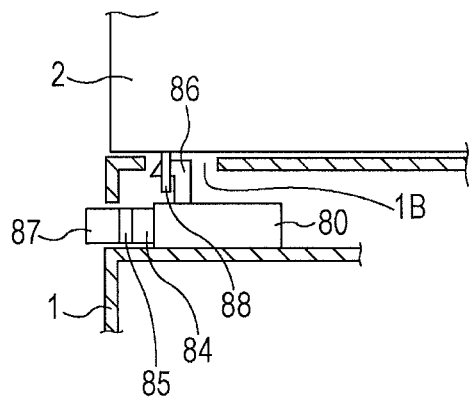
FIG. 13B is a partially enlarged sectional view depicting the state in which the display unit is locked to the body unit by the close lock mechanism depicted in FIG. 13B.

FIG. 13B depicts the state in which the close lock mechanism 8 depicted in FIG. 13A is mounted on the inside of the body unit 1 and the display unit 2 is locked to the body unit 1, where the tip of the sliding member 84 projects from the body unit 1 as the lock release button 87. In a casing of the body unit 1 straight above the close lock mechanism 8 mounted on the body unit 1, a hole 1B is provided for letting a lock loop 88 pass therethrough, the lock loop 88 provided on a rear surface of the display unit 2 to project therefrom. The lock loop 88 is an engaging member engaged with the lock projection 86, and the shape and position of the lock loop 88 are depicted in FIG. 9A. With the display unit 2 laid on the body unit 1, the lock loop 88 on the display unit 2 is engaged with the lock projection 86 of the close lock mechanism 8, and therefore the display unit 2 does not open from the body unit 1.

Figure 13C:
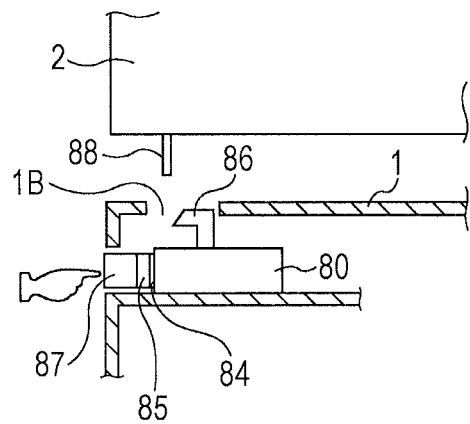
FIG. 13C is a partially enlarged sectional view depicting the state in which the display unit and the body unit are unlocked from each other in the close lock mechanism depicted in FIG. 13B.

In the state depicted in FIG. 13B, when the lock release button 87 is pressed as depicted in FIG. 13C, the sliding member 84 is pressed into the case 80 until the stoppers 85 abut on the case 80, and the lock projection 86 moves in the upper surface opening 82. When the lock loop 88 is released from the lock projection 86 with the movement of the lock projection 86, the link mechanism 30B1 described above causes the display unit 2 to open with respect to the body unit 1. When the pressing of the lock release button 87 is stopped, the sliding member 84 returns to the position depicted in FIG.

13B. In this state, when the display unit 2 is laid on the body unit 1, the lock loop 88 abuts on the lock projection 86. However, since a tapered part is provided on an upper surface of the lock projection 86, the lock loop 88 presses the tapered part to cause the sliding member 84 to retract into the case 80. With this operation, the lock loop 88 is locked to the lock projection 86. This state is depicted in FIG. 13B.

Figure 13D:
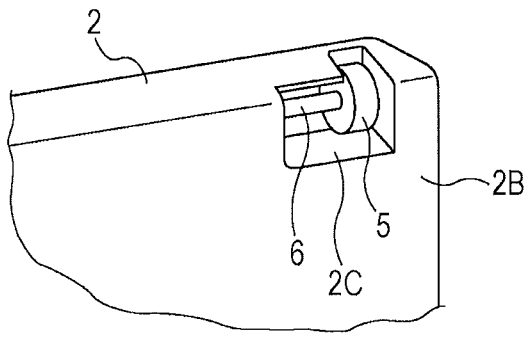
FIG. 13D is a partially enlarged sectional view depicting the structure of an example of a running roller provided to a lower end of the display unit.
Figure 13E:
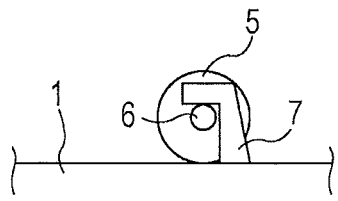
FIG. 13E is a partially enlarged sectional view depicting the state in which a rotating shaft of the running roller depicted in FIG. 13D is engaged with a rotating shaft support unit.

FIG. 13D depicts the structure of an example of the running roller 5 provided at the lower end 2B of the display unit 2. A recess 2C is provided at the lower end 2B on each of both sides of the display unit 2. Inside this recess 2C, the running roller 5 mounted on the rotating shaft 6 is provided. The running roller 5 includes an outer circumferential surface slightly projecting from the recess 2C. When the display unit 2 starts a sliding and tilting operation, the running roller 5 abuts on the upper surface of the body unit 2. FIG. 13E depicts the state in which the rotating shaft 6 of the running roller 5 depicted in FIG. 13D is engaged with the rotating shaft support unit 7 provided on the upper surface of the body unit 1 to project therefrom. FIG. 13E depicts a partially-enlarged engagement state between the rotating shaft 6 and the rotating shaft support unit 7 depicted in, for example, FIG. 2A, FIG. 4A, and FIG. 7C. The rotating shaft 6 engaged with the rotating shaft support unit 7 serves as a rotation center when the tilt angle of the display unit 2 is changed.

The above-described information device 50 including the link mechanism 30B1 mounted thereon may be used with the display unit 2 being laid on the body unit 1 as depicted in FIG. 6A and with the display unit 2 being raised from the body unit 1 to be tilted as depicted in FIG. 6C. Furthermore, the information device 50 may be used with the display unit 2 being raised from the body unit 1 to be tilted and then the tilt angle of the display unit 2 being changed as depicted in FIG. 9B. Since the keyboard 21 is exposed in the state depicted in FIG. 6C and FIG. 9B, an input operation may be performed on the information device 50 by using the keyboard 21.

Figure 14A:
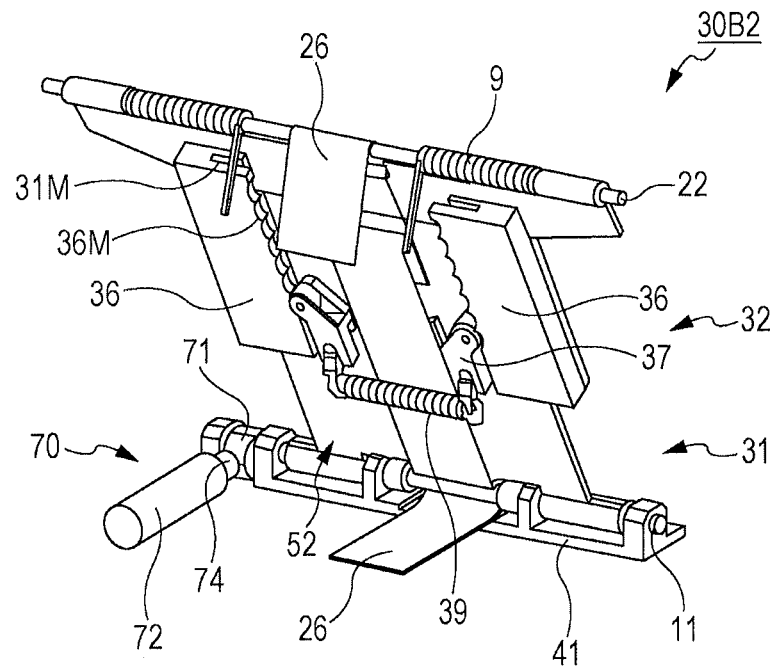
FIG. 14A is a perspective view corresponding to the state of FIG. 10A, depicting the structure of a link mechanism of a second example of the second embodiment.
Figure 14B:
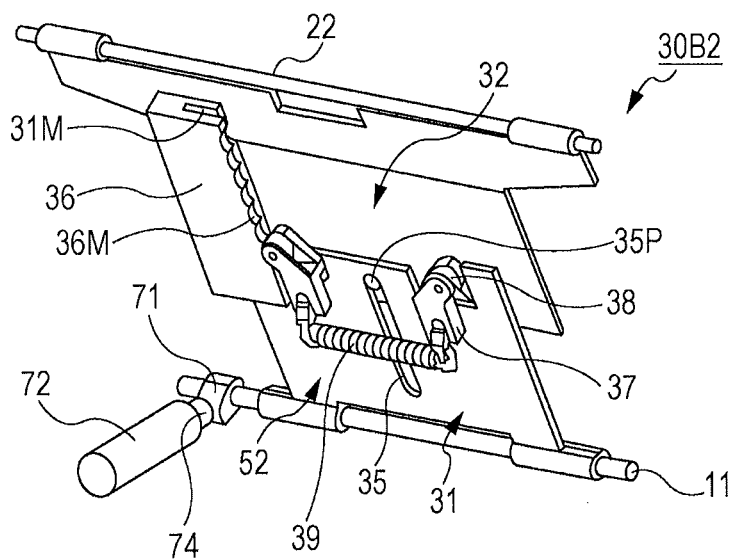
FIG. 14B is a perspective view depicting the internal structure of the link mechanism with components partially removed from FIG. 14A.
Figure 15A:
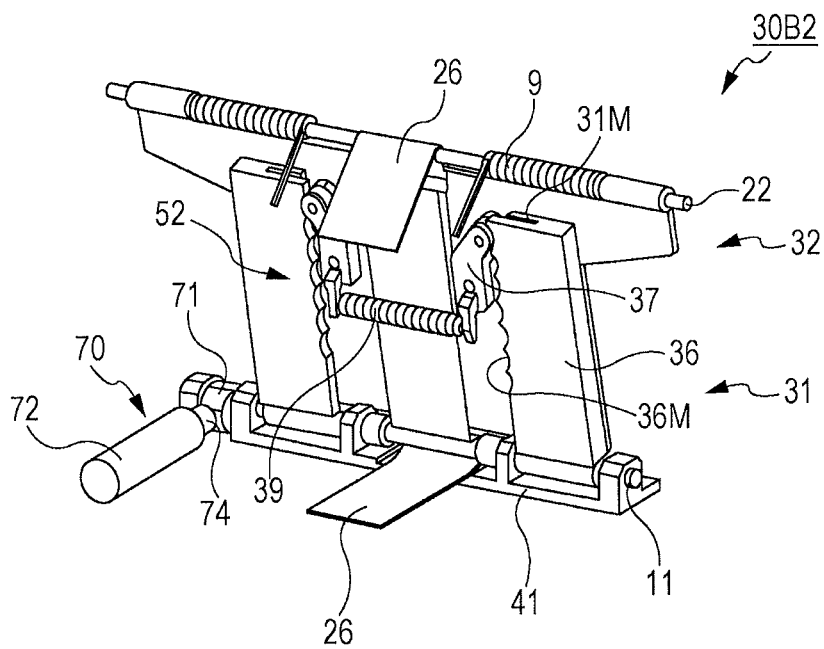
FIG. 15A is a perspective view when the tilt angle is changed after tilting of the display unit is completed with respect to the body unit from the state depicted in FIG. 14A.
Figure 15B:
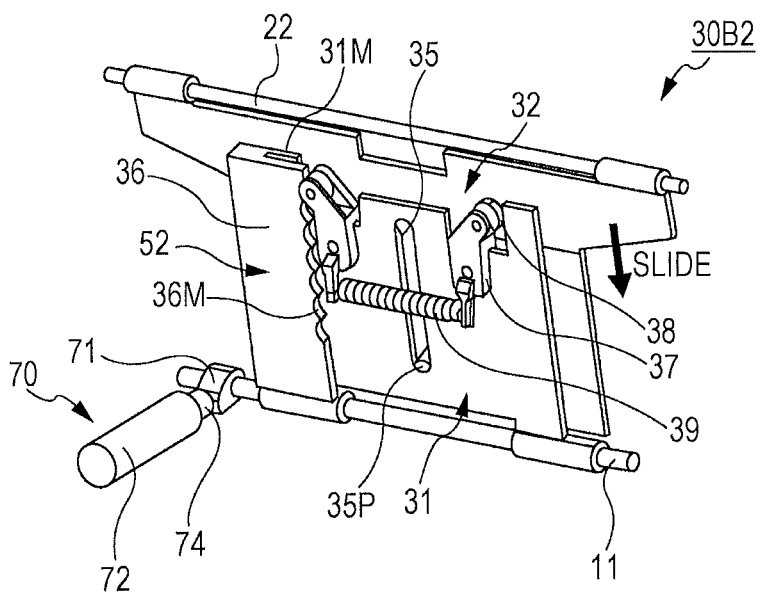
FIG. 15B is a perspective view depicting the internal structure of the link mechanism with components partially removed from FIG. 15A.
Figure 16A:
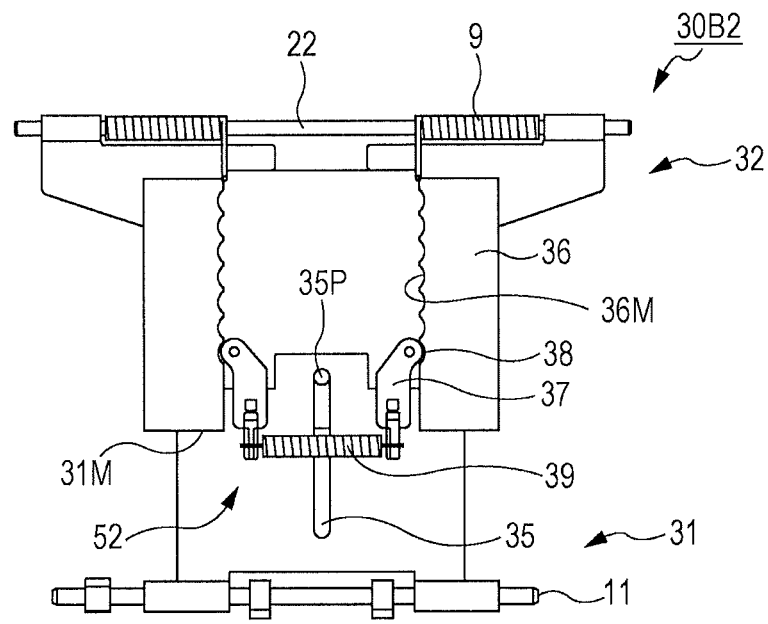
FIG. 16A is a diagram of the link mechanism depicted in FIG. 14A when viewed from a direction perpendicular to the link mechanism.
Figure 16B:
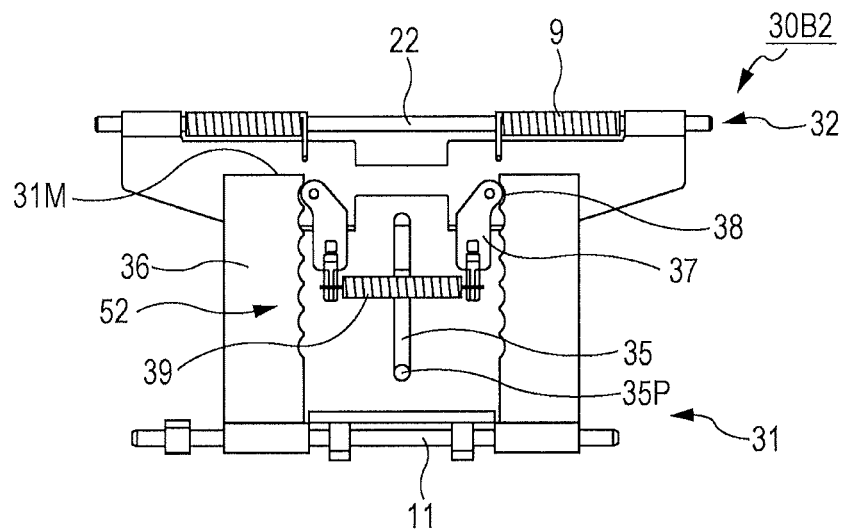
FIG. 16B is a diagram of the link mechanism depicted in FIG. 15A when viewed from a direction perpendicular to the link mechanism.

Next, the structure and operation of a link mechanism 30B2 of a second example of the second embodiment mounted between the body unit 1 and the display unit 2 (hereinafter simply referred to as a link mechanism 30B2) are described with reference to FIG. 14A, FIG. 14B, FIG. 15A, FIG. 15B, FIG. 16A, and FIG. 16B. FIG. 14A, FIG. 14B, and FIG. 16A each depict the state in which the sliding and tilting operation of the display unit 2 is completed, and correspond to FIG. 10A, FIG. 10B, and FIG. 12A, respectively, in which the link mechanism 30B1 is described. FIG. 15A, FIG. 15B, and FIG. 16B each depict the state in which the tilt angle of the display unit 2 is changed at a maximum, and correspond to FIG. 11A, FIG. 11B, and FIG. 12B, respectively, in which the link mechanism 30B1 is described. FIG. 14B clarifies the internal structure with components partially removed from FIG. 14A, and FIG. 15B clarifies the internal structure with components partially removed from FIG. 15A.

As depicted in FIG. 14A, FIG. 14B, and FIG. 16A, the body unit side link 31 of the link mechanism 30B2 has a flat plate shape including the rotating shaft 11 axially supported by the first bracket 41. Also, the display unit side link 32 including the second rotating shaft 22 has a flat plate shape, and the slide guides 36 are provided on both sides on a surface of the display unit side link 32 on a body unit side. Each slide guide 36 is provided with the grooves 31M. In these grooves 31M, the free end of the body unit side link 31 is inserted. The body unit side link 31 is able to make a sliding movement in the grooves 31M to the display unit side. At the center of the body unit side link 31, the slit 35 is provided extending in a display unit direction. At the center on a tip side of the display unit side link 32, the guide pin 35P is provided to project and fit in this slit 35. With the slit 35, the guide pin 35P, and the slide guides 36, the body unit side link 31 is able to make a sliding movement in the grooves 31M straight to the display unit side. Also as described above, the slit 35 and the guide pin 35P have a function of regulating the sliding amount of the body unit side link 31 so that the display unit side link 32 does not come off from the body unit side link 31.

Furthermore, between the body unit side link 31 and the display unit side link 32, a sliding amount adjusting mechanism 52 is provided to allow the sliding amount of the display unit side link 32 with respect to the body unit side link 31 to be adjusted in a stepwise manner. The sliding amount adjusting mechanism 52 includes the plurality of lock grooves 36M provided to each of the slide guides 36 of the display unit side link 32, the lock levers 37 provided to the body unit side link 31, the lock rollers 38, and the lock spring 39. The lock grooves 36M are provided at each of edges of the slide guides 36 facing each other, and are engaged with the lock roller 38 for positioning. The lock grooves 36M are shallow grooves. With application of an external force, the lock roller 38 is able to easily move from one lock groove 36M to another adjacent lock groove 36M.

Two lock levers 37 are each rotatably mounted on the rotating shafts each projecting at an axisymmetric position with respect to the line dividing the body unit side link 31 on the body unit side link 31. Each lock roller 38 is rotatably mounted by the rotating shaft on a tip of the lock lever 37. With rotation of the lock lever 37, the lock roller 38 is engaged with the lock groove 36M. The lock spring 39 is an extension spring running between ends of the lock levers 37 on a side opposite to the lock rollers 38. By pulling the ends not provided with the lock rollers 38 of the lock levers 37 to each other, the lock spring 39 rotates the lock levers 37 to press the lock rollers 38 onto the lock grooves 36M.

After the sliding and tilting operation of the display unit 2 is completed with respect to the body unit 1, when the tilt angle of the display unit 2 is changed by using the sliding amount adjusting mechanism 52, an operation of holding the upper edge of the display unit 2 to lay down or raise the display unit 2 is performed. With this operation, the lock rollers 38 of the sliding amount adjusting mechanism 52 each go out of the lock groove 36M engaging therewith so far and move to one adjacent lock groove 36M or further adjacent lock groove 36M. Every time the lock rollers 38 each move to one adjacent lock groove 36M one by one from the position depicted in FIG. 14A, FIG. 14B, and FIG. 16A, the body unit side link 31 is accommodated in the display unit side link 32. Then, as the overlapping portion between the body unit side link 31 and the display unit side link 32 increases, the sliding amount of the body unit side link 31 is changed, and the tilt angle of the display unit 2 is changed.

The spring force of the lock spring 39 is set so that the lock rollers 38 do not come off from the lock grooves 36M with a touch force when the display unit 2 is touched by a finger but come off from the lock grooves 36M when the upper edge of the display unit 2 is held to move. That is, the spring force is set so that the lock rollers 38 come off from the lock grooves 36M with an operation force for changing the tilt angle of the display unit 2.

FIG. 15A, FIG. 15B, and FIG. 16B each depict the state in which the lock rollers 38 move to the lock grooves 36M nearest to the second rotating shaft 22 from the position depicted in FIG. 14A, FIG. 14B, and FIG. 16A. That is, when the link mechanism 30B2 is in the state depicted in FIG. 15A, FIG. 15B, and FIG. 16B, the information device 50 becomes in the state depicted in FIG. 9B and FIG. 9C. As such, the information device 50 including the link mechanism 30B2 is able to smoothly make a transition from a closed state to a tilted state and perform a tilt angle changing operation from a tilted state.

Figure 17A:
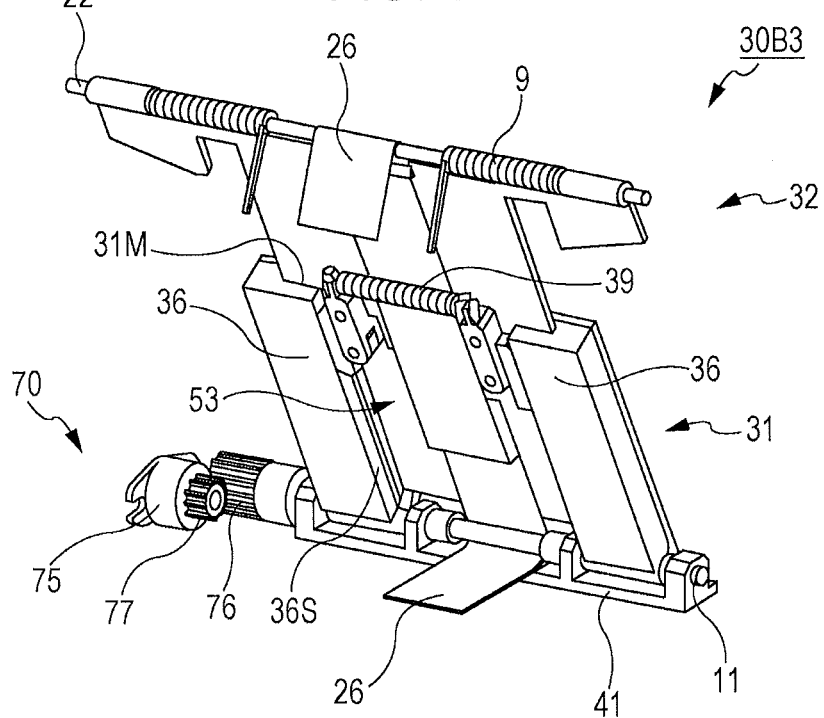
FIG. 17A is a perspective view corresponding to the state of FIG. 10A, depicting the structure of a link mechanism of a third example of the second embodiment.
Figure 17B:
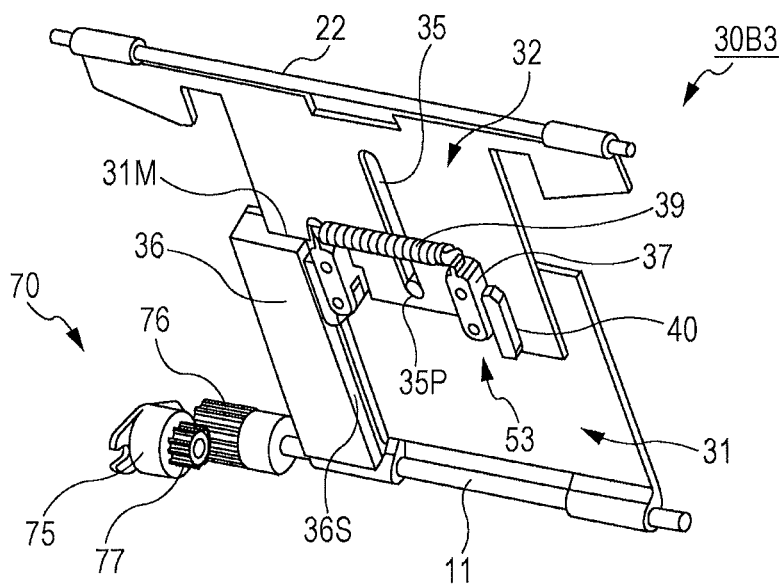
FIG. 17B is a perspective view depicting the internal structure of the link mechanism with components partially removed from FIG. 17A.
Figure 18A:
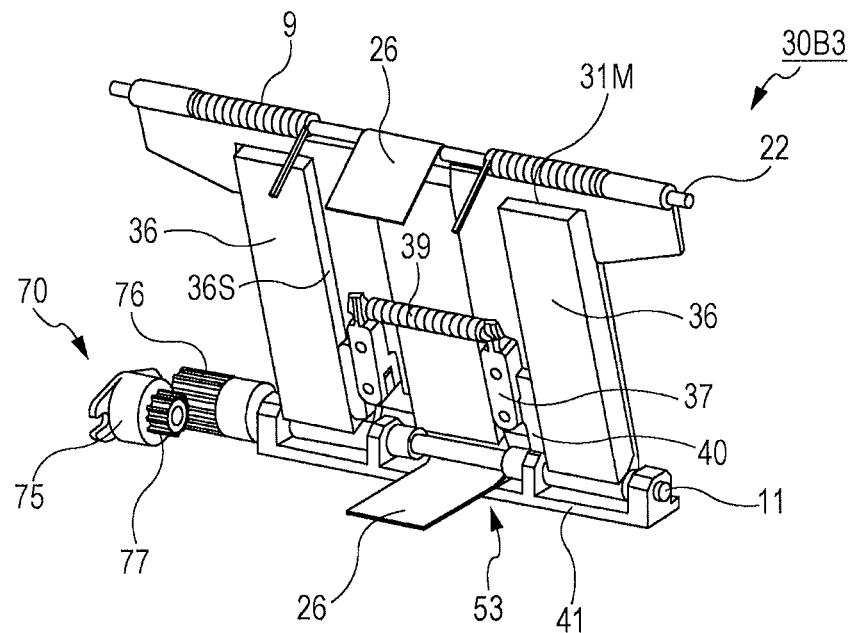
FIG. 18A is a perspective view when the tilt angle is changed after tilting of the display unit is completed with respect to the body unit from the state depicted in FIG. 17A.
Figure 18B:
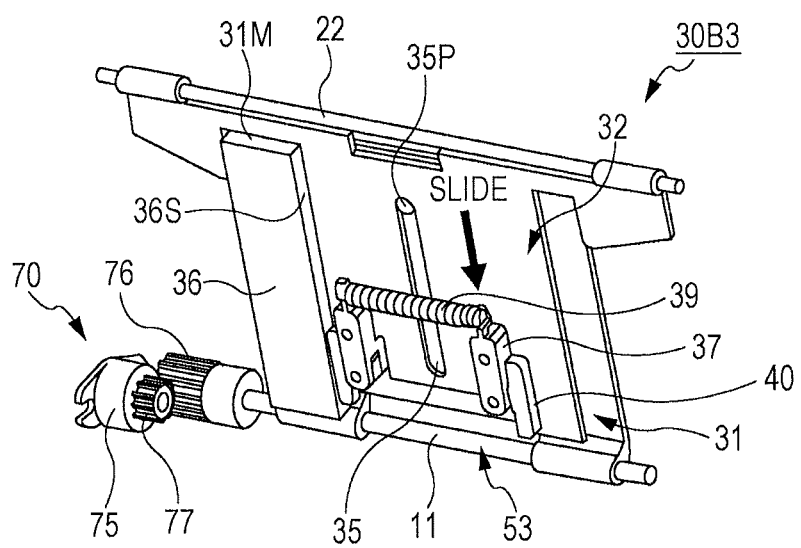
FIG. 18B is a perspective view depicting the internal structure of the link mechanism with components partially removed from FIG. 18A.
Figure 19A:
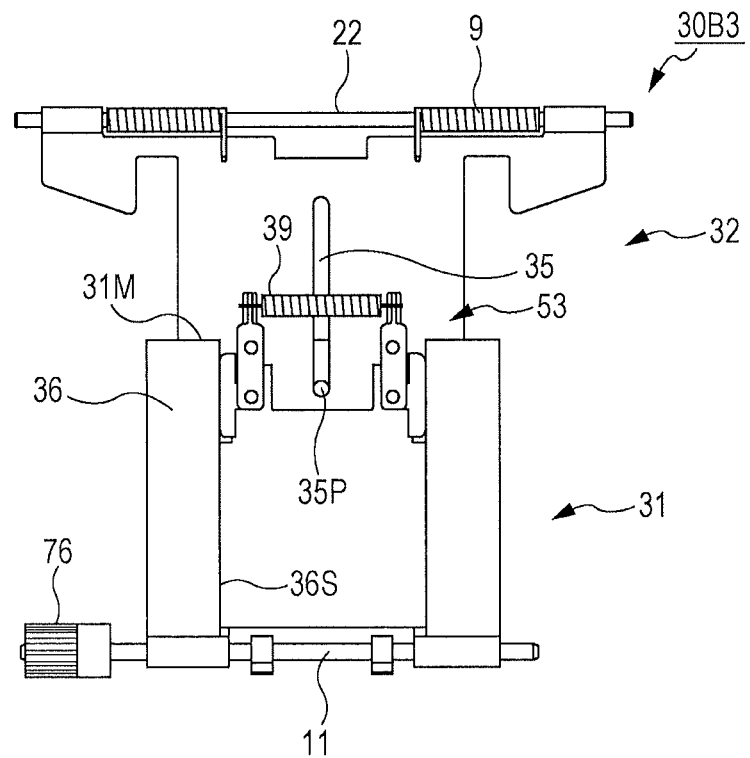
FIG. 19A is a diagram of the link mechanism depicted in FIG. 17A when viewed from a direction perpendicular to the link mechanism.
Figure 19B:
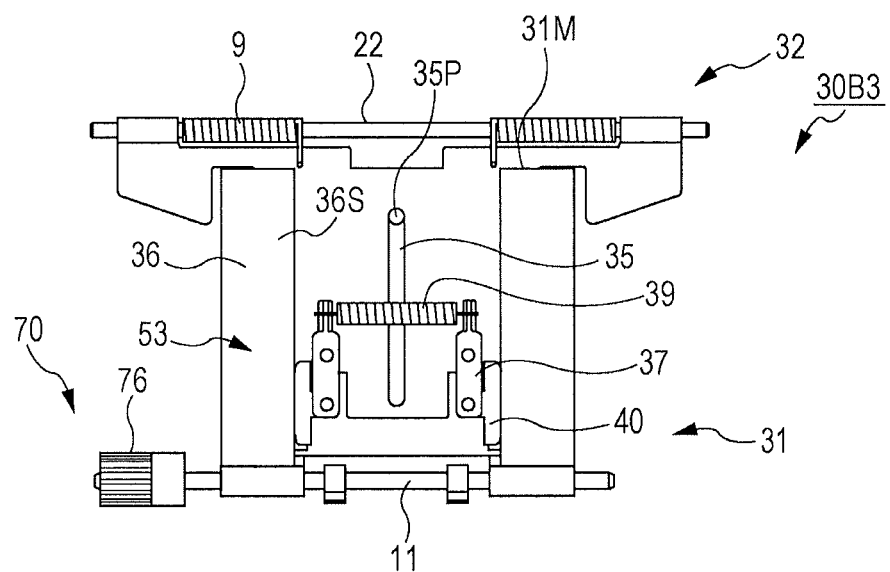
FIG. 19B is a diagram of the link mechanism depicted in FIG. 18A when viewed from a direction perpendicular to the link mechanism.

Still further, the structure and operation of a link mechanism 30B3 of a third example of the second embodiment mounted between the body unit 1 and the display unit 2 (hereinafter simply referred to as a link mechanism 30B3) are described with reference to FIG. 17A, FIG. 17B, FIG. 18A, FIG. 18B, FIG. 19A, and FIG. 19B. FIG. 17A, FIG. 17B, and FIG. 19A each depict the state in which the sliding and tilting operation of the display unit 2 is completed, and correspond to FIG. 10A, FIG. 10B, and FIG. 12A, respectively, in which the link mechanism 30B1 is described. FIG. 18A, FIG. 18B, and FIG. 19B each depict the state in which the tilt angle of the display unit 2 is changed at a maximum, and correspond to FIG. 11A, FIG. 11B, and FIG. 12B, respectively, in which the link mechanism 30B1 is described. FIG. 17B clarifies the internal structure with components partially removed from FIG. 17A, and FIG. 18B clarifies the internal structure with components partially removed from FIG. 18A.

As depicted in FIG. 17A, FIG. 17B, and FIG. 19A, the body unit side link 31 of the link mechanism 30B3 has a flat plate shape including the rotating shaft 11 axially supported by the first bracket 41. Also, the slide guides 36 are provided on both sides on a surface of the body unit side link 31 on a body unit side. Each slide guide 36 is provided with the grooves 31M. In these grooves 31M, the free end of the display unit side link 32 is inserted. The display unit side link 32 is able to make a sliding movement in the grooves 31M to the body unit side. At the center of the display unit side link 32, the slit 35 is provided extending in a sliding direction of the display unit side link 32. At the center on the tip side of the body unit side link 31, the guide pin 35P is provided to project and fit in this slit 35. With the slit 35, the guide pin 35P, and the slide guides 36, the display unit side link 32 is able to make a sliding movement in the grooves 31M straight to the body unit side. Also as described above, the slit 35 and the guide pin 35P have a function of regulating the sliding amount of the body unit side link 31 so that the display unit side link 32 does not come off from the body unit side link 31.

Furthermore, between the body unit side link 31 and the display unit side link 32, a sliding amount adjusting mechanism 53 is provided to allow the sliding amount of the display unit side link 32 with respect to the body unit side link 31 to be adjusted in a continuous manner. The sliding amount adjusting mechanism 53 includes a sliding surface 36S provided on each slide guide 36 of the body unit side link 31, the lock levers 37 provided to the display unit side link 32, lock pads 40, and the lock spring 39. The sliding surfaces 36S are provided to edges of the slide guides 36 facing each other, and are each engaged with the lock pad 40 for positioning. An abut face of the lock pad 40 with the sliding surface 36S is a surface with a predetermined coefficient of friction. When a predetermined external force is applied, the sliding surface 36S and the lock pad 40 slide each other.

Two lock levers 37 are each rotatably mounted on the rotating shafts each projecting at an axisymmetric position with respect to the line dividing the display unit side link 32 on the display unit side link 32. The lock pad 40 is slidably provided at a tip of each lock lever 37. With rotation of the lock lever 37, the lock pad 40 is pressed onto the sliding surface 36S. The lock spring 39 is an extension spring running between ends of the lock levers 37 on a side opposite to the lock pads 40. By pulling the ends not provided with the lock pads 40 of the lock levers 37 to each other, the lock spring 39 rotates the lock levers 37 to press the lock pads 40 onto the sliding surface 36S.

After the sliding and tilting operation of the display unit 2 is completed with respect to the body unit 1, when the tilt angle of the display unit 2 is changed by using the sliding amount adjusting mechanism 53, an operation of holding the upper edge of the display unit 2 to lay down or raise the display unit 2 is performed. With this operation, the lock pads 40 of the sliding amount adjusting mechanism 53 each move over the sliding surface 36S. Every time the lock pads 40 each move over the sliding surface 36S from the position depicted in FIG. 17A, FIG. 17B, and FIG. 19A, the display unit side link 32 is accommodated in the body unit side link 31. Then, as the overlapping portion between the display unit side link 32 and the body unit side link 31 increases, the sliding amount of the display unit side link 32 is changed, and the tilt angle of the display unit 2 is changed.

The spring force of the lock spring 39 is set so that the lock pads 40 do not slide over the sliding surfaces 36S with a touch force when the display unit 2 is touched by a finger but slide over the sliding surfaces 36S when the upper edge of the display unit 2 is held to move. That is, the spring force is set so that the lock pads 40 slide over the sliding surfaces 36S with an operation force for changing the tilt angle of the display unit 2.

In the link mechanism 30B3, the structure of the damper mechanism 70 is different from those of other examples. The damper mechanism 70 in the link mechanism 30B3 includes a first gear wheel 76 mounted on the first rotating shaft 11, a second gear wheel 77 to be engaged with the first gear wheel 76, and a damper 75 that weakens the rotating speed. The inside of the damper 75 is filled with oil. With this oil, the rotating speed of the rotating shaft of the damper 75 having the second gear wheel 77 mounted thereon is weakened. Another mode of the damper mechanism 70 may be thought, and the mode is not particularly restrictive.

FIG. 18A, FIG. 18B, and FIG. 19B each depict the state in which the lock pad 40 is moved from the position depicted in FIG. 17A, FIG. 17B, and FIG. 19A, respectively, to a sliding surface 36S nearest to the first rotating shaft 11. That is, when the link mechanism 30B3 is in the state depicted in FIG. 18A, FIG. 18B, and FIG. 19B, the information device 50 becomes in the state depicted in FIG. 9B and FIG. 9C. As such, the information device 50 including the link mechanism 30B3 is able to smoothly make a transition from a closed state to a tilted state and further perform a tilt angle changing operation from a tilted state in a free stop manner.

Figure 20A:
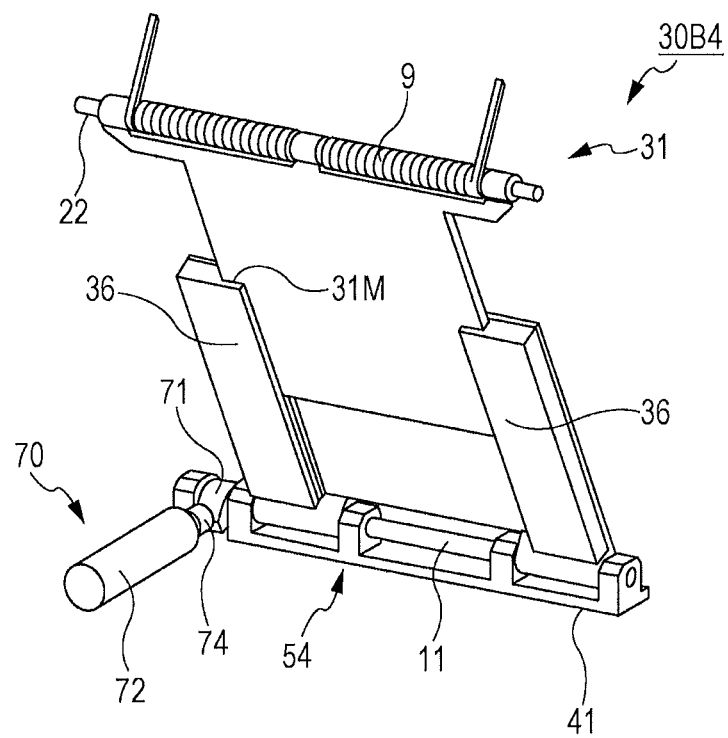
FIG. 20A is a perspective view corresponding to the state of FIG. 10A, depicting the structure of a link mechanism of a fourth example of the second embodiment.
Figure 20B:
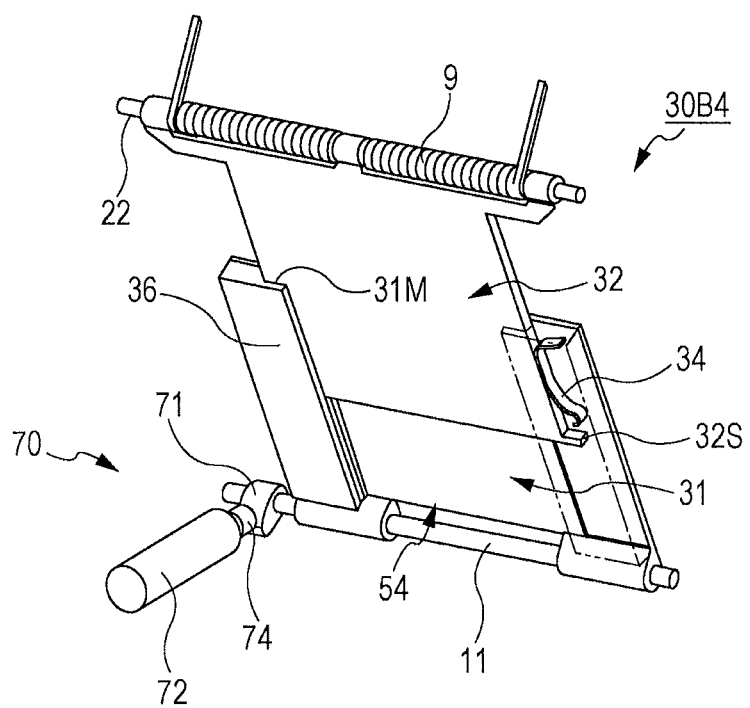
FIG. 20B is a perspective view depicting the internal structure of the link mechanism with components partially removed from FIG. 20A.
Figure 21A:
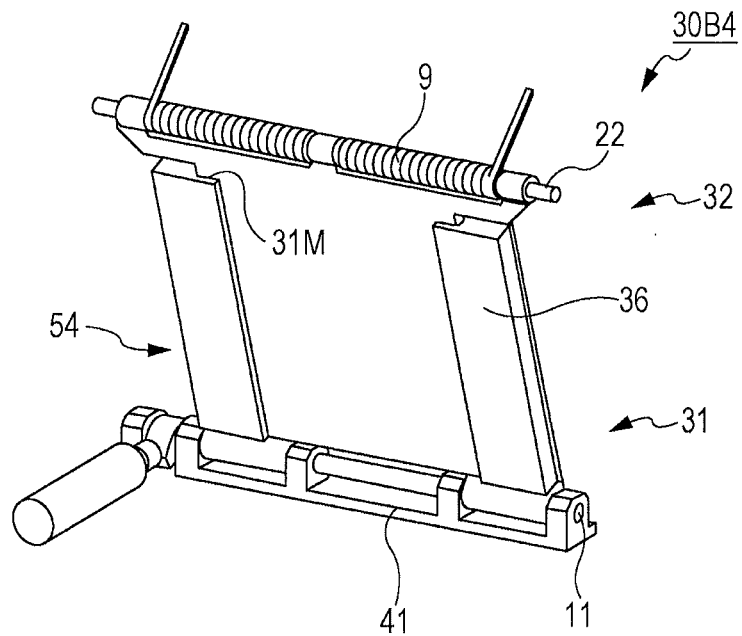
FIG. 21A is a perspective view when the tilt angle is changed after tilting of the display unit is completed with respect to the body unit from the state depicted in FIG. 20A.
Figure 21B:
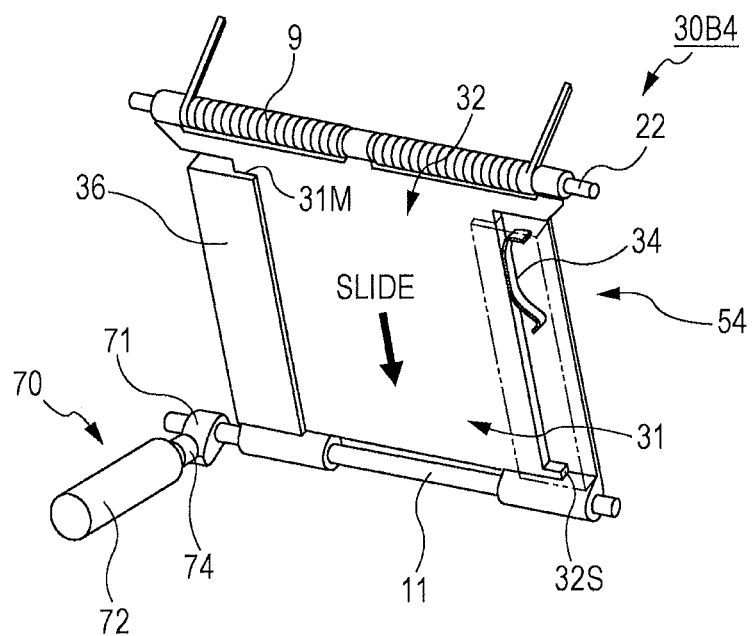
FIG. 21B is a perspective view depicting the internal structure of the link mechanism with components partially removed from FIG. 21A.
Figure 22A:
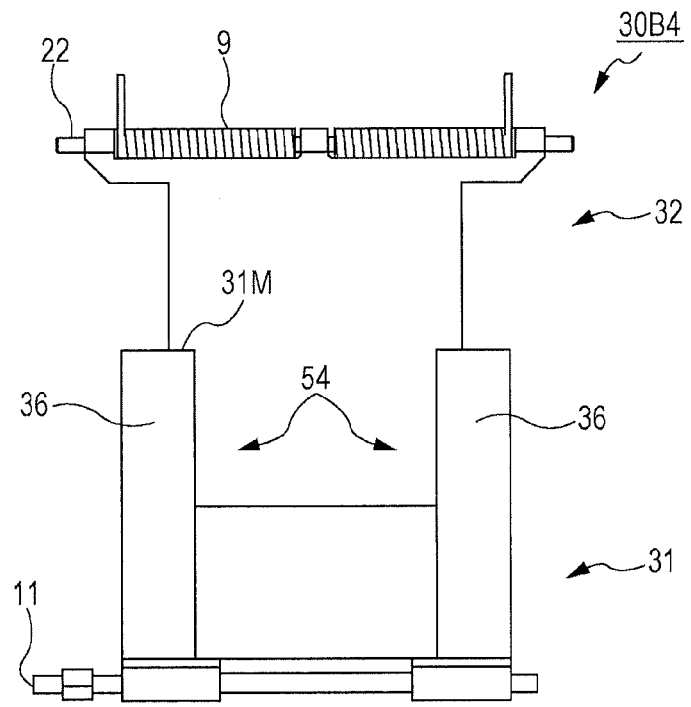
FIG. 22A is a diagram of the link mechanism depicted in FIG. 20A when viewed from a direction perpendicular to the link mechanism.
Figure 22B:
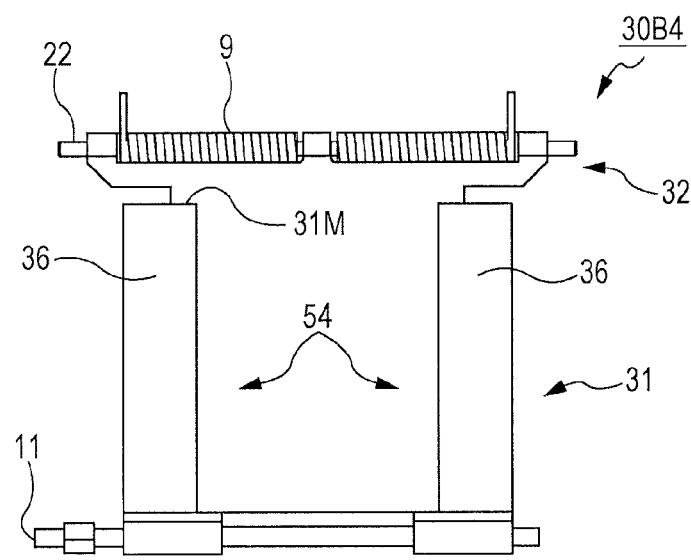
FIG. 22B is a diagram of the link mechanism depicted in FIG. 21A when viewed from a direction perpendicular to the link mechanism.

Next, the structure and operation of a link mechanism 30B4 of a fourth example of the second embodiment mounted between the body unit 1 and the display unit 2 (hereinafter simply referred to as a link mechanism 30B4) are described with reference to FIG. 20A, FIG. 20B, FIG. 21A, FIG. 21B, FIG. 22A, and FIG. 22B. FIG. 20A, FIG. 20B, and FIG. 22A each depict the state in which the sliding and tilting operation of the display unit 2 is completed, and correspond to FIG. 10A, FIG. 10B, and FIG. 12A, respectively, in which the link mechanism 30B1 is described. FIG. 21A, FIG. 21B, and FIG. 22B each depict the state in which the tilt angle of the display unit 2 is changed at a maximum, and correspond to FIG. 11A, FIG. 11B, and FIG. 12B, respectively, in which the link mechanism 30B1 is described. FIG. 20B clarifies the internal structure with components partially removed from FIG. 20A, and FIG. 21B clarifies the internal structure with components partially removed from FIG. 21A.

As depicted in FIG. 20A, FIG. 20B, and FIG. 22A, the body unit side link 31 of the link mechanism 30B4 has a parallel shape including the rotating shaft 11 axially supported by the first bracket 41. Also, the slide guides 36 are provided on a surface on the body unit side. Each slide guide 36 is provided with the groove 31M. The display unit side link 32 has a flat plate shape having one end provided with a second rotating shaft and the other end inserted in the groove 31M described above. The display unit side link 32 is able to make a sliding movement in the grooves 31M to the body unit side.

Note that in the link mechanism 30B4, the slit 35 and the guide pin 35P as described above having a function of regulating the sliding amount of the body unit side link 31 so that the display unit side link 32 does not come off from the body unit side link 31 are not provided. Instead, the link mechanism 30B4 is provided with a projection 32S on the free end of the display unit side link 32 as depicted in FIG. 20B and FIG. 21B, the projection 32S regulating a maximum sliding amount of the display unit side link 32. Furthermore, although not depicted in the drawings, a wall that engages with the projection 32S to stop the movement of the projection 32S is provided in the groove 31M of each slide guide 36. In the link mechanism 30B4, when the display unit 2 is raised and the display unit side link 32 is pulled out from the body unit side link 31, the projection 32S abuts on the wall. Therefore, the display unit side link 32 does not come off from the body unit side link 31.

Furthermore, between the body unit side link 31 and the display unit side link 32, a sliding amount adjusting mechanism 54 is provided to allow the sliding amount of the display unit side link 32 with respect to the body unit side link 31 to be adjusted in a continuous manner. The sliding amount adjusting mechanism 54 includes a holding spring 34 provided deep inside the groove 31M of each slide guide 36. The holding spring 34 is provided on each of both two slide guides 36. With the holding sprint 34, the flat plate part of the display unit side link 32 is pressed from both sides so as not to move with ease. When a predetermined external force is applied to the display unit side link 32, the display unit side link 32 moves against the pressing force by the holding springs 34.

After the sliding and tilting operation of the display unit 2 is completed with respect to the body unit 1, when the tilt angle of the display unit 2 is changed by using the sliding amount adjusting mechanism 54, an operation of holding the upper edge of the display unit 2 to lay down or raise the display unit 2 is performed. With this operation, the display unit side link 32 moves against the pressing force by the holding springs 34 of the sliding amount adjusting mechanism 54. Every time the display unit side link 32 moves against the pressing force by the holding springs 34 from the position depicted in FIG. 20A, FIG. 20B, and FIG. 22A, the display unit side link 32 is accommodated in the body unit side link 31. Then, as the overlapping portion between the display unit side link 32 and the body unit side link 31 increases, the sliding amount of the display unit side link 32 is changed, and the tilt angle of the display unit 2 is changed.

The spring force of the holding springs 34 is set so that the display unit side link 32 does not move against the pressing force by the holding springs 34 with a touch force when the display unit 2 is touched by a finger. On the other hand, the spring force of the holding springs 34 is set so that the display unit side link 32 moves against the pressing force by the holding springs 34 when the upper end of the display unit 2 is held to move. That is, the spring force is set so that the display unit side link 32 moves against the pressing force by the holding springs 34 with an operation force for changing the tilt angle of the display unit 2.

FIG. 21A, FIG. 21B, and FIG. 22B each depict the state in which the display unit side link 32 moves from the position depicted in FIG. 20A, FIG. 20B, and FIG. 22A, respectively, to a position nearest to the first rotating shaft 11. That is, when the link mechanism 30B4 is in the state depicted in FIG. 21A, FIG. 21B, and FIG. 22B, the information device 50 becomes in the state depicted in FIG. 9B and FIG. 9C. As such, the information device 50 including the link mechanism 30B4 is able to smoothly make a transition from a closed state to a tilted state and further perform a tilt angle changing operation from a tilted state in a free stop manner.

Figure 23A:
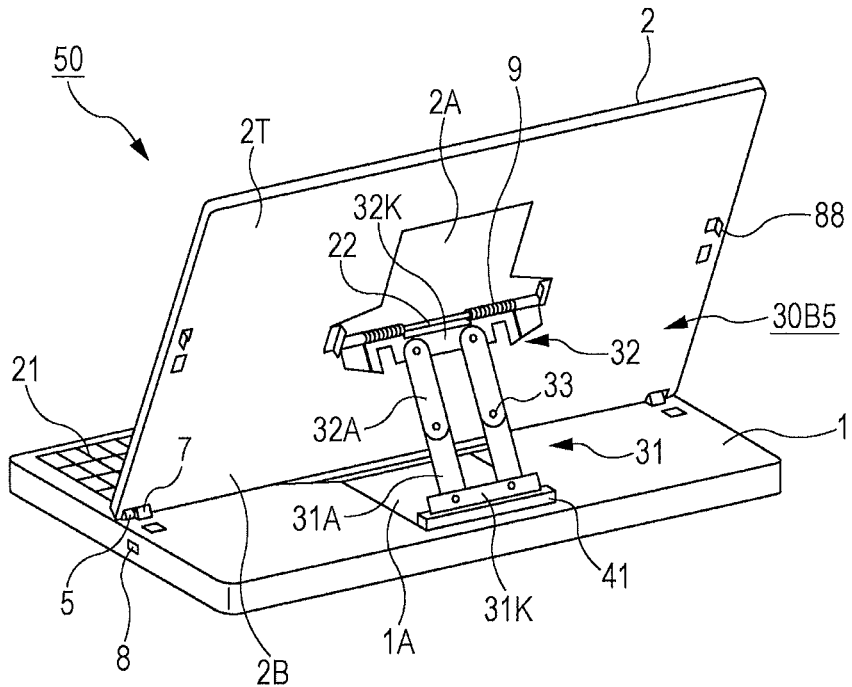
FIG. 23A is a perspective view depicting the state in which the tilting operation of the display unit is completed by a link mechanism of a fifth example of the second embodiment.

FIG. 23A is a perspective view depicting the state in which the tilting operation of the display unit 2 is completed in the information device 50 including a link mechanism 30B5 of a fifth example of the second embodiment (hereinafter simply referred to as a link mechanism 30B5), when viewed from a rear surface side. The structure of the information device 50 except the link mechanism 30B5 is identical to those of the information devices 50 including the link mechanisms 30B1 to 30B4. The body unit side link 31 in the link mechanism 30B5 includes a link base 31K including a first rotating shaft rotatably supported by a bracket 41 on a rear side of the body unit 1 and two link arms 31A rotatably mounted on the link base 31K so as to include a predetermined space apart from each other. Also, the display unit side link 32 in the link mechanism 30B5 includes a link base 32K rotatably supported by a second rotating shaft 22 and two link arms 32A rotatably mounted on the link base 32K so as to include a predetermined space apart from each other.

Other ends of each of the two link arms 31A and each of the two link arms 32A are rotatably coupled together by a third rotating shaft 33. The mount space of the two link arms 31A on the link base 31K is equal to the mount space of the two link arms 32A on the link base 32K. Therefore, the two link arms 31A and the two link arms 32A coupled together by the third rotating shafts 33 are placed in parallel to each other between the link base 31K and the link base 32K, respectively.

Each link arm 31A and each link arm 32A in the link mechanism 30B5 are coupled together at a coupling part by the third rotating shaft 33. This coupling part is normally fixed by a lock mechanism (not depicted) so as not to rotate. Therefore, the distance between the link base 31K and the link base 32K in the link mechanism 30B5 is uniform unless the lock mechanism is unlocked. Also, a running roller 5 mounted on a tilt rotating shaft is provided at the lower end 2B of the display unit 2 on a lower side. On the upper surface of the body unit 1, the rotating shaft support unit 7 is provided that engages with the tilt rotating shaft to stop the movement of the tilt rotating shaft when the running roller 5 moves over the surface of the body unit 1. Thus, as with the examples described above, when the upper end 2T of the display unit 2 is pulled up with respect to the body unit 1, the display unit 2 performs a sliding and tilting operation by the link mechanism 30B5 with respect to the body unit 1, and the display unit 2 is tilted. In the tilting operation of the display unit 2, the distance between the link base 31K and the link base 32K in the link mechanism 30B5 is unchanged.

Figure 23B:
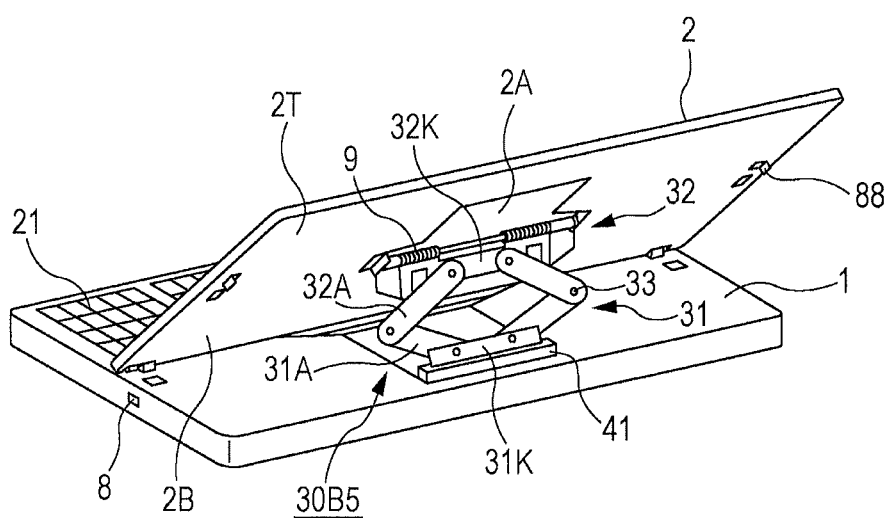
FIG. 23B is a side view depicting the state in which the tilt angle of the display unit is changed by a mid-folding mechanism from the state depicted in FIG. 23A.

In the state depicted in FIG. 23A, when the lock mechanism provided at the engaging parts of the link arm 31A and the link arm 32A is unlocked, the link arm 31A and the link arm 32A are deformable in a direction in which the distance between the third rotating shafts 33 is widened. Thus, in this state, when the upper end 2T of the display unit 2 is pushed to a rear side, the distance between the third rotating shafts 33 is widened, and mid-folding is made between the link arm 31A and the link arm 32A in a manner as if a pantograph is folded. As a result, the distance between the link base 31K and the link base 32K is reduced and, as depicted in FIG. 23B, the display unit 2 rotates about the tilt rotating shaft, thereby allowing the tilt angle to be changed. In this case, it is sufficient to provide the coupling part including the third rotating shaft 33 with a mechanism that suppresses the rotation of the display unit side link 32 with respect to the body unit side link 31 or a mechanism that causes the rotation of the display unit side link 32 in a stepwise manner.

The information device including the above-structured link mechanism provided between the body unit and the display unit may be profitable in the followings.

(1) Since the display unit is changed from the state of being laid on the body unit to the state of being tilted with one-step operation, smooth operability is provided.

(2) Since the tilt angle is changeable further from a tilted state, the user is allowed to set the display unit at an easy-to-view angle, thereby enhancing usability.

(3) Since the display unit does not go outside from an upper space of the body unit when the display unit is changed from the state of being laid on the body unit to the state of being tilted, operation may be performed in a narrow space.

(4) Also when the tilted state is returned to a closed state, the state is changed with one-step operation. Therefore, smooth operability is provided.

(5) When the tilt angle is changed further from the tilted state, the lower end of the display unit is held at a certain position. This allows the keyboard of the body unit to be placed up to near the lower end of the display unit. Therefore, the operation surface of the keyboard is widened, and operability of the keyboard is enhanced.

(6) In the link mechanism of the second embodiment, the rear side of the display unit is supported by the link. Therefore, the display unit does not shake when the touch panel is operated in a tilted state, and stiffness is provided to the display unit at the time of touch panel operation to allow a stable touch operation.

The present disclosure includes been described in detail above particularly with reference to the preferable embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tilt mechanism for an information device including a body unit and a display unit, the tilt mechanism being capable of changing a tilt angle of the display unit after the display unit is tilted on the body unit by pulling up an upper end of the display unit laid on the body unit and sliding a lower end of the display unit over the body unit, the tilt mechanism comprising:
   a running roller provided at the lower end of the display unit;
   a rotating shaft support unit provided on an upper surface of the body unit and configured to rotatably engage a rotating shaft of the running roller;
   a first link mounted on the body at one end of the first link so as to rotate by using a first rotating shaft, the first link including a first engaging unit at the other end of the first link;
   a second link mounted on the display unit at one end of the second link so as to rotate by using a second rotating shaft, the second link including a second engaging unit at the other end of the second link; and
   a link mechanism configured to maintain an engaging state in which the first engaging unit and the second engaging unit are engaged together until the rotating shaft of the running roller is engaged with the rotating shaft support unit by pulling up the display unit from a state of being laid on the body unit, and configured to be deformable so that a distance between the first rotating shaft and the second rotating shaft is shortened by releasing the engaging state of the first engaging unit and the second engaging unit after the rotating shaft of the running roller is engaged with the rotating shaft support unit.

2. The tilt mechanism for the information device according to claim 1,
   wherein the first rotating shaft and the second rotating shaft are provided on side surfaces of the first casing and the second casing.

3. The tilt mechanism for the information device according to claim 1,
   wherein the first rotating shaft is provided on an upper surface of the first casing, and the second rotating shaft is provided on a rear surface of the second casing.

4. The tilt mechanism for the information device according to claim 2,
   wherein the first engaging unit of the first link includes a groove, and the second engaging unit of the second link is slidably inserted in the groove.

5. The tilt mechanism for the information device according to claim 2,
   wherein the first engaging unit of the first link and the second engaging unit of the second link are rotatably coupled together by a third rotating shaft.

6. The tilt mechanism for the information device according to claim 5,
   wherein a coupling part where the first engaging unit and the second engaging unit are coupled together by the third rotating shaft is provided with a lock mechanism that holds the first link and the second link on a straight line.

7. The tilt mechanism for the information device according to claim 3,
   wherein the second rotating shaft includes a pressing unit configured to press the second link in a direction in which the second rotating shaft goes away from the first casing,
   a lock mechanism is provided between the first casing and the second casing, the lock mechanism being configured to fix the second casing on the first casing with the first casing being laid on the second casing, and
   when the lock mechanism is unlocked, the second casing is automatically tilted from the first casing by the pressing unit.

8. The tilt mechanism for the information device according to claim 7,
   wherein a damper mechanism is provided on a first casing side, the damper mechanism configured to weaken a rotating speed of the first link that makes a rotational movement about the first rotating shaft.

9. The tilt mechanism for the information device according to claim 8,
   wherein the damper mechanism includes a damper cam mounted on the first rotating shaft, a contact that abuts on an outer circumferential surface of the damper cam, and a damper that weakens a moving speed of the contact.

10. The tilt mechanism for the information device according to claim 8, wherein the damper mechanism includes a first gear wheel mounted on the first rotating shaft, a second gear wheel that engages with the first gear wheel, and a damper that weakens a moving speed of the second gear wheel.

11. The tilt mechanism for the information device according to claim 7,
wherein the first link and the second link each include a flat plate shape,
slide guides are provided on both side parts of the first link in a width direction,
grooves in which the second link is inserted and lock grooves provided continuously in a longitudinal direction of the slide guides are provided to edges of the slide guides facing each other, and
the second engaging unit of the second link is inserted in the grooves, paired lock levers each including a lock roller that engages with a relevant one of the lock grooves are rotatably mounted on a free end side of the second link, and the lock levers typically engage the lock rollers with the lock grooves by a pressing force of a lock spring.

12. The tilt mechanism for the information device according to claim 7,
wherein the first link and the second link each include a flat plate shape,
slide guides are provided on both side parts of the second link in a width direction,
grooves in which the first link is inserted and lock grooves provided continuously in a longitudinal direction of the slide guides are provided to edges of the slide guides facing each other, and
the first engaging unit of the first link is inserted in the grooves, paired lock levers each including a lock roller that engages with a relevant one of the lock grooves are rotatably mounted on a free end side of the first link, and the lock levers typically engage the lock rollers with the lock grooves by a pressing force of a lock spring.

13. The tilt mechanism for the information device according to claim 7,
wherein the first link and the second link each include a flat plate shape,
slide guides are provided on both side parts of the first link in a width direction,
grooves in which the second link is inserted and sliding surfaces provided in parallel to a longitudinal direction of the slide guides are provided to edges of the slide guides facing each other, and
the second engaging unit of the second link is inserted in the grooves, paired lock levers each including a lock pad that abuts on a relevant one of the sliding surfaces are rotatably mounted on a free end side of the second link, and the lock levers typically press the lock pads onto the sliding surfaces by a pressing force of a lock spring.

14. The tilt mechanism for the information device according to claim 7,
wherein the first link and the second link each include a flat plate shape,
slide guides are provided on both side parts of the first link in a width direction,
grooves in which the second link is inserted are provided to edges of the slide guides facing each other, and
the second engaging unit of the second link is inserted in the grooves, and a holding spring that suppresses a movement of edges of the second link is provided at a portion inside the slide guides facing the edges of the second link.

15. The tilt mechanism for the information device according to claim 7,
wherein the first link includes a first link base including the first rotating shaft and two first link arms having one end rotatably mounted on the first link base so as to include a predetermined space from each other and another end including a first engaging unit,
the second link includes a second link base including the second rotating shaft and two second link arms having one end rotatably mounted on the second link base so as to include a predetermined space from each other and another end including a second engaging unit,
the first engaging unit and the second engaging unit are rotatably coupled together by a third rotating shaft, and
a lock mechanism that holds the first link and the second link on a straight line is provided at a coupling part between the first engaging unit and the second engaging unit by the third rotating shaft.

* * * * *